United States Patent
Chirik et al.

(10) Patent No.: US 10,717,752 B2
(45) Date of Patent: Jul. 21, 2020

(54) DEHYDROGENATIVE SILYLATION, HYDROSILYLATION AND CROSSLINKING USING PYRIDINEDIIMINE COBALT CARBOXYLATE CATALYSTS

(71) Applicants: MOMENTIVE PERFORMANCE MATERIALS INC., Waterford, NY (US); PRINCETON UNIVERSITY, Princeton, NJ (US)

(72) Inventors: Paul Chirik, Princeton, NJ (US); Christopher Schuster, Plainsboro, NJ (US); Julie Boyer, Watervliet, NY (US); Kenrick Lewis, Flushing, NY (US); Johannes G. P. Delis, Bergen op Zoom (NL); Aroop K. Roy, Mechanicville, NY (US)

(73) Assignees: MOMENTIVE PERFORMANCE MATERIALS INC., Waterford, NY (US); PRINCETON UNIVERSITY, Princeton, NJ (US)

( * ) Notice: Subject to any disclaimer, the term of this patent is extended or adjusted under 35 U.S.C. 154(b) by 122 days.

(21) Appl. No.: 15/746,448

(22) PCT Filed: Jul. 22, 2016

(86) PCT No.: PCT/US2016/043464
§ 371 (c)(1),
(2) Date: Jan. 22, 2018

(87) PCT Pub. No.: WO2017/019473
PCT Pub. Date: Feb. 2, 2017

(65) Prior Publication Data
US 2018/0201634 A1 Jul. 19, 2018

Related U.S. Application Data

(60) Provisional application No. 62/196,408, filed on Jul. 24, 2015.

(51) Int. Cl.
| | |
|---|---|
| *C08G 77/08* | (2006.01) |
| *C07F 7/18* | (2006.01) |
| *B01J 31/18* | (2006.01) |
| *C07F 15/06* | (2006.01) |
| *B01J 31/22* | (2006.01) |

(52) U.S. Cl.
CPC ......... *C07F 7/1876* (2013.01); *B01J 31/1815* (2013.01); *B01J 31/2239* (2013.01); *C07F 15/065* (2013.01); *C08G 77/08* (2013.01); *B01J 2231/323* (2013.01); *B01J 2531/845* (2013.01)

(58) Field of Classification Search
None
See application file for complete search history.

(56) References Cited

U.S. PATENT DOCUMENTS

| | | | | |
|---|---|---|---|---|
| 5,045,428 A * | 9/1991 | Sacripante | ......... | G03G 9/08773 428/423.1 |
| 5,955,555 A * | 9/1999 | Bennett | ................ | B01J 31/1616 526/133 |
| 6,461,994 B1 * | 10/2002 | Gibson | ...................... | C07C 2/32 502/155 |
| 6,657,026 B1 * | 12/2003 | Kimberley | ........... | C07D 213/53 502/113 |
| 7,053,020 B2 * | 5/2006 | De Boer | ................ | B01J 31/122 502/155 |
| 7,442,819 B2 * | 10/2008 | Ionkin | .................... | B01J 31/184 502/155 |
| 7,955,660 B2 * | 6/2011 | Rantala | .................. | C08G 77/08 427/387 |
| 8,236,915 B2 * | 8/2012 | Delis | ....................... | C07F 15/02 528/14 |
| 8,415,443 B2 * | 4/2013 | Delis | .................... | B01J 31/1815 502/150 |
| 8,895,770 B2 * | 11/2014 | Lewis | .................. | C07F 15/025 556/456 |

(Continued)

FOREIGN PATENT DOCUMENTS

| | | |
|---|---|---|
| CN | 104447725 | 3/2015 |
| CS | 171597 | 2/1976 |

OTHER PUBLICATIONS

Balaram Raya "Nickel and Cobalt-Catalyzed Hydrofunctionalization Reaction of Alkene" Dissertation, The Ohio State University, 2016, 347 pages. (Year: 2016).*
Constable, Edwin C. et al., "Structural Characteristics of a 1:1 cobalt (II)-2,2':6',2"-Terpyridine complex," Inorganic Chemistry Communications 9 (2006), 504-506.
Cartes, M. A. et al., "Protonolysis of Fe—C bonds of a diiminopyridineiron(II) dialkyl complex by acids of different strengths: Influence of monoanionic ligands on the spectroscopic properties of diiminopyiridine-FeY2 complexes," Inorganica Chimica Acta 412 (20014), 73-78.

(Continued)

*Primary Examiner* — Robert S Loewe
(74) *Attorney, Agent, or Firm* — Joseph Waters; McDonald Hopkins LLC

(57) ABSTRACT

A process for producing a silylated product comprises reacting a mixture comprising (a) an unsaturated compound containing at least one unsaturated functional group, (b) a silyl hydride containing at least one silylhydride functional group, and (c) a catalyst, optionally in the presence of a solvent, to produce a dehydrogenative silylated product, a hydrosilylated product, or a combination of a dehydrogenative silylated product and a hydrosilylated product, wherein the catalyst is chosen from a pyridine diimine cobalt dicarboxylate complex or a cobalt carboxylate compound, and the process is conducted without pre-activating the catalyst via a reducing agent and/or without an initiator or promoter compound. The present catalysts have been found to be active in the presence of the silyl hydride employed in the silylation reaction.

41 Claims, No Drawings

(56) References Cited

U.S. PATENT DOCUMENTS

| | | |
|---|---|---|
| 2011/0009565 A1 | 1/2011 | Delis et al. |
| 2012/0130106 A1 | 5/2012 | Chirik et al. |
| 2014/0051822 A1 | 2/2014 | Atienza et al. |
| 2014/0228570 A1* | 8/2014 | Brandstadt .......... B01J 31/2295 546/4 |
| 2014/0231702 A1* | 8/2014 | Brandstadt .............. B01J 37/00 252/78.3 |
| 2014/0249311 A1 | 9/2014 | Brandstadt et al. |
| 2014/0034331 A1 | 11/2014 | Boyer |
| 2014/0330036 A1* | 11/2014 | Lewis ................... C07F 7/0829 556/481 |
| 2015/0080536 A1 | 3/2015 | Tianning et al. |
| 2015/0141647 A1* | 5/2015 | Diao ..................... C07F 15/065 546/2 |
| 2015/0141648 A1* | 5/2015 | Diao ....................... C07F 15/06 546/4 |

OTHER PUBLICATIONS

Tondreau, Aaron M. et al., "Iron Catalysts for Selective Anti-Markovnikov Alkene Hydrosilylation Using Tertiary Silanes," Science 335 (2012), 567-570.

Atienza, Crisita et al., "High-Selectivity Bis(imino)pyridine Iron Catalysts for the Hydrosilylation of 1,2,4-Trivinylcyclohexane," ACS Catalysis 2 (2012), 2169-2172.

Atienza, Crisita et al., "Bis(imino)pyridine Cobalt-Catalyzed Dehydrogenative Silylation of Alkenes: Scope, Mechanism, and Origins of Selective Allylsilane Formation," Journal of the American Chemical Society (2014).

International Search Report and Written Opinion dated Oct. 4, 2016; International Patent Application No. PCT/US2016-043464 filed Jul. 22, 2016; ISA/EP.

Schuster et al, Bench-Stable, Substrate-Activated Cobalt Carboxylate Pre-Catalysts for Alkene Hydrosilylation with Tertiary Silanes, ACS Catal., 2016, pp. 2632-2636.

* cited by examiner

DEHYDROGENATIVE SILYLATION, HYDROSILYLATION AND CROSSLINKING USING PYRIDINEDIIMINE COBALT CARBOXYLATE CATALYSTS

CROSS-REFERENCE TO RELATED APPLICATIONS

The present application claims priority to Internation Patent Application No. PCT/US2016/043464 entitled, "Dehydrogenative Silylation, Hydrosilylation and Crosslinking Using Pyridinediimine Cobalt Carboxylate Catalysts," filed on Jul. 22, 2016, which claims priority to and the benefit of U.S. Provisional Application No. 62/196,408 entitled "Dehydrogenative Silylation, Hydrosilylation and Crosslinking Using Pyridinediimine Cobalt Carboxylate Catalysts," filed on Jul. 24, 2015, ceach of which are incorporated herein by reference in their entirety.

FIELD OF THE INVENTION

This invention relates generally to transition metal-containing compounds, more specifically to cobalt carboxylate complexes containing pyridine di-imine ligands and their use as efficient dehydrogenative silylation, hydrosilylation, and crosslinking catalysts.

BACKGROUND OF THE INVENTION

Hydrosilylation chemistry, typically involving a reaction between a silyl hydride and an unsaturated organic group, is the basis for synthetic routes to produce commercial silicone-based products like silicone surfactants, silicone fluids, silanes, as well as many addition cured products like sealants, adhesives, and silicone-based coating products. Typical hydrosilylation reactions use precious metal catalysts to catalyze the addition of a silyl-hydride (Si—H) to an unsaturated group, such as an olefin. In these reactions, the resulting product is a silyl-substituted, saturated compound. In most of these cases, the addition of the silyl group proceeds in an anti-Markovnikov manner, i.e., to the less substituted carbon atom of the unsaturated group. Most precious metal catalyzed hydrosilylations only work well with terminally unsaturated olefins, as internal unsaturations are generally non-reactive or only poorly reactive. There are currently only limited methods for the general hydrosilylation of olefins where after the addition of the Si—H group there still remains an unsaturation in the original substrate. This reaction, termed a dehydrogenative silylation, has potential uses in the synthesis of new silicone materials, such as silanes, silicone fluids, crosslinked silicone elastomers, and silylated or silicone-crosslinked organic polymers such as polyolefins, unsaturated polyesters, etc.

Various precious metal catalysts are known in the art. For example, U.S. Pat. No. 3,775,452 discloses a platinum complex containing unsaturated siloxanes as ligands. This type of catalyst is known as Karstedt's catalyst. Other exemplary platinum-based hydrosilylation catalysts that have been described in the literature include Ashby's catalyst as disclosed in U.S. Pat. No. 3,159,601, Lamoreaux's catalyst as disclosed in U.S. Pat. No. 3,220,972, and Speier's catalyst as disclosed in Speier, J. L.; Webster, J. A.; Barnes, G. H. *J. Am. Chem. Soc.* 1957, 79, 974.

There are examples of the use of $Fe(CO)_5$ to promote limited hydrosilylations and dehydrogenative silylations. (See Nesmeyanov, A. N.; Freidlina, R. Kh.; Chukovskaya, E. C.; Petrova, R. G.; Belyaysky, A. B. *Tetrahedron* 1962, 17, 61 and Marciniec, B.; Majchrzak, M. *Inorg. Chem. Commun.* 2000, 3, 371). The use of $Fe_3(CO)_{12}$ was also found to exhibit dehydrogenative silylation in the reaction of $Et_3SiH$ and styrene. (Kakiuchi, F.; Tanaka, Y.; Chatani, N.; Murai, S. *J. Organomet. Chem.* 1993, 456, 45). Also, several cyclopentadiene iron complexes have been used to varying degrees of success, with the work of Nakazawa, et al showing interesting intramolecular dehydrogenative silylation/hydrogenation when used with 1,3-divinyldisiloxanes. (Naumov, R. N.; Itazaki, M.; Kamitani, M.; Nakazawa, H. *J. Am. Chem. Soc.* 2012, 134, 804).

A rhodium complex was found to give low to moderate yields of allyl-silanes and vinyl silanes. (Doyle, M. P.; Devora G. A.; Nevadov, A. O.; High, K. G. *Organometallics,* 1992, 11, 540). An iridium complex was also found to give vinyl silanes in good yields. (Falck, J. R.; Lu, B. *J. Org. Chem.* 2010, 75, 1701) Allyl silanes could be prepared in high yields using a rhodium complex (Mitsudo, T.; Watanabe, Y.; Hori, Y. *Bull. Chem. Soc. Jpn.* 1988, 61, 3011). Vinyl silanes could be prepared through the use of a rhodium catalyst (Murai, S.; Kakiuchi, F.; Nogami, K.; Chatani, N.; Seki, Y. *Organometallics,* 1993, 12, 4748). Dehydrogenative silylation was found to occur when iridium complexes were used (Oro, L. A.; Fernandez, M. J.; Esteruelas, M. A.; Jiminez, M. S. *J. Mol. Catalysis* 1986, 37, 151 and Oro, L. A.; Fernandez, M. J.; Esteruelas, M. A.; Jiminez, M. S. *Organometallics,* 1986, 5, 1519). Vinyl silanes could also be produced using ruthenium complexes (Murai, S.; Seki, Y.; Takeshita, K.; Kawamoto, K.; Sonoda, N. *J. Org. Chem.* 1986, 51, 3890).

A palladium-catalyzed silyl-Heck reaction was recently reported to result in the formation of allyl-silanes and vinyl silanes (McAtee, J. R.; Martin, S. E. S.; Ahneman, D. T.; Johnson, K. A.; Watson, D. A. *Angew. Chem. Int. Ed.* 2012, 51, 3663); McAtee, J. R.; Yap, G. P. A.; Watson, D. A. *J. Am. Chem. Soc.* 2014, 136, 10166).

U.S. Pat. No. 5,955,555 describes the synthesis of certain iron or cobalt pyridine di-imine (PDI) complexes bearing two ionic ligands. The preferred anions are chloride, bromide and tetrafluoroborate. U.S. Pat. No. 7,442,819 describes iron and cobalt complexes of certain tricyclic ligands containing a "pyridine" ring substituted with two imino groups. U.S. Pat. Nos. 6,461,994, 6,657,026, and 7,148,304 describe several catalyst systems containing certain transition metal-PDI complexes. U.S. Pat. No. 7,053,020 describes a catalyst system containing, inter alia, one or more bis(arylimino) pyridine iron or cobalt catalyst. Chink et al describe bis(arylimino) pyridine cobalt complexes with anionic ligands (Bowman, A. C.; Milsmann, C.; Bill, E.; Lobkovsky, E.; Weyhermüller, T.; Wieghardt, K.; Chink, P. J. *Inorg. Chem.* 2010, 49, 6110 and Bowman, A. C.; Milsmann, C.; Atienza, C. C. H.; Lobkovsky, E.; Wieghardt, K.; Chink, P. J. *J. Am. Chem. Soc.* 2010, 132, 1676.) U.S. Pat. Nos. 8,765,987, 8,895,770, and 8,927,674, and U.S. Patent Publication No. 2015/0137033 describe hydrosilylation and/or dehydrogenative silylation with cobalt, iron, or other first-row transition metal pyridine diimine complexes. The catalysts and catalyst systems disclosed in these references employ the use of a strong reducing agent, such as an alkyl lithium or alkali metal borohydride, to form precatalysts or generate active catalysts in situ. A particular deficiency of using strong reducing agents to activate base metal catalysts towards hydrosilylation or dehydrogenative silylation is the disproportionation of alkoxysilylhydrides to generate pyrophoric silane ($SiH_4$). In general, the use of alkyl lithiums, Grignards, and alkali metals to activate catalysts is disadvantageous. U.S. Patent Publication No. 2014/0343311, WO 2013/043783 and WO 2013/043846 describe the use of a promoter to activate base metal compounds and complexes towards hydrosilylation without the need for a strong reducing agent.

SUMMARY OF THE INVENTION

The present technology provides non-precious metal-based catalysts that are effective for efficiently catalyzing dehydrogenative silylation and/or hydrosilylation using simple base metal compounds and complexes without the need to use strong reducing agents. The catalysts exhibit air stability, which allows the catalysts to be used in a variety of applications and conditions.

In one aspect, the present invention is directed to a process for producing a silylated product comprising reacting a mixture comprising (a) an unsaturated compound containing at least one unsaturated functional group, (b) a silyl hydride containing at least one silylhydride functional group, and (c) a catalyst, optionally in the presence of a solvent, to produce a dehydrogenative silylated product, a hydrosilylated product, or a combination of a dehydrogenative silylated product and a hydrosilylated product, wherein the catalyst is a complex of the Formula (I) or an adduct thereof; Formula (II) or an adduct thereof; or a combination thereof;

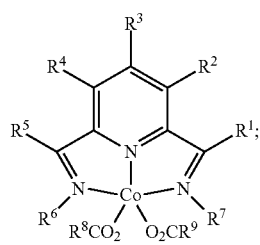

(I)

Co(carboxylate)$_2$;

(II)

wherein each occurrence of $R^1$, $R^2$, $R^3$, $R^4$, and $R^5$ is independently chosen from hydrogen, a C1-C18 alkyl, a C1-C18 substituted alkyl, an aryl, a substituted aryl, or an inert substituent, where $R^1$-$R^5$, other than hydrogen, may optionally contain at least one heteroatom;

each occurrence of $R^6$ and $R^7$ is independently chosen from a C1-C18 alkyl, a C1-C18 substituted alkyl, an aryl, or a substituted aryl, where $R^6$ and $R^7$ may optionally contain at least one heteroatom;

optionally any two neighboring groups of $R^1$, $R^2$, $R^3$, $R^4$, $R^5$, $R^6$, and $R^7$ taken together may form a ring being a substituted or unsubstituted, saturated, or unsaturated cyclic structure; and $R^8$ and $R^9$ is each independently, chosen from an alkyl or aryl group optionally containing at least one heteroatom; and the carboxylate is derived from substituted or unsubstituted, straight-chain, branched or cyclic aliphatic carboxylic acid or aromatic carboxylic acid, and which optionally contains one or more heteroatoms chosen from O, N, S, P, Si, F, Cl, Br, I, or a combination of two or more thereof;

wherein the mixture is free of a separate reducing agent and a promoter.

In one embodiment, $R^8$ and $R^9$ are $CH_3$ such that the carboxylate groups are acetate.

In one embodiment, $R^8$ and $R^9$ are 3-heptyl such that the carboxylate groups are 2-ethylhexanoate.

In one embodiment, $R^8$ and $R^9$ are $C(CH_3)_3$.

In one embodiment, $R^6$ and $R^7$ are independently chosen from a C1-C10 alkyl. In one embodiment, $R^6$ and $R^7$ are each methyl. In one embodiment, $R^6$ and $R^7$ are each ethyl. In one embodiment, $R^6$ and $R^7$ are each cyclohexyl.

In embodiments, $R^1$-$R^7$ and/or $R^5$-$R^6$ may form a ring. The ring(s) formed from $R^1$-$R^7$ and/or $R^5$-$R^6$ may be formed from carbon atoms or may include other heteroatoms (besides the imine nitrogen atom). In one embodiment, $R^1$-$R^7$ and $R^5$-$R^6$ taken together form a 5-membered heterocyclic ring structure with the imine nitrogen. In one embodiment, the ring formed $R^1$-$R^7$ and/or $R^5$-$R^6$ may be a five membered ring optional comprising one or more heteroatoms (other than the nitrogen from the imine group.

In one embodiment, the catalyst is chosen from:

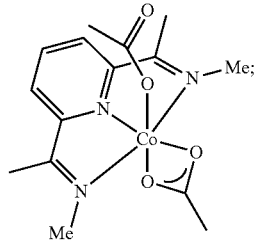

(III)

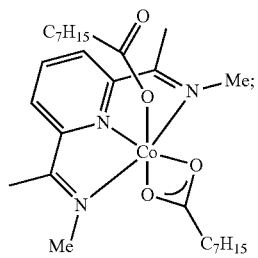

(IV)

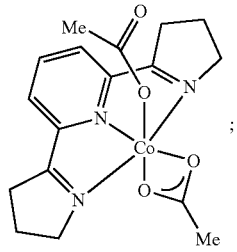

(V)

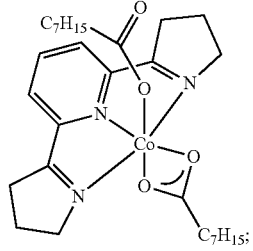

(VI)

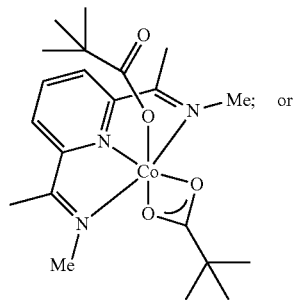

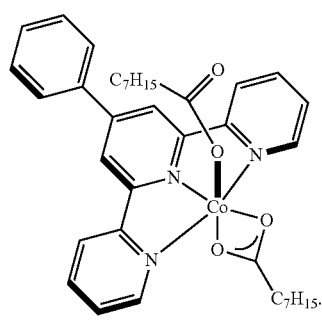

In one embodiment the metal carboxylate is chosen from Co(acetate)$_2$·4H$_2$O, anhydrous Co(acetate)$_2$, or Co(2-ethylhexanoate)$_2$ In one embodiment, component (a) is chosen from an olefin, a cycloalkene, an unsaturated polyether, a vinyl-functional alkyl-capped allyl or methallyl polyether, an alkyl-capped terminally unsaturated amine, an alkyne, a terminally unsaturated acrylate or methacrylate, an unsaturated aryl ether, a vinyl-functionalized polymer or oligomer, a vinyl-functionalized silane, a vinyl-functionalized silicone, an unsaturated fatty acid, an unsaturated ester, or a combination of two or more thereof.

In one embodiment, component (a) is chosen from a compound of the formula:

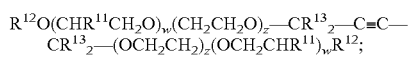

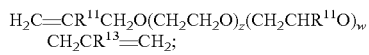

or a combination of two or more thereof, wherein $R^{10}$ is chosen from an unsaturated organic group containing from 2 to 10 carbon atoms; $R^{12}$ is chosen from hydrogen, a vinyl group, or a polyether capping group of from 1 to 8 carbon atoms; each occurrence of $R^{11}$ is independently chosen from a monovalent hydrocarbon group having 1-20 carbon atoms, an aryl group, an alkaryl, an aralkyl, a cycloalkyl group; each occurrence of $R^{13}$ is independently chosen from hydrogen, a monovalent hydrocarbon group having 1-20 carbon atoms, an aryl group, an alkaryl group, an aralkyl group, or a cycloalkyl group; each occurrence of z is 0 to 100 inclusive; and, each occurrence of w is 0 to 100 inclusive.

In one embodiment, component (a) is chosen from N,N-dimethylallyl amine, allyloxy-substituted polyethers, propylene, 1-butene, 1-hexene, styrene, vinylnorbornane, 5-vinyl-norbornene, 1-octadecene, cyclopentene, cyclohexene, norbornene, 3-hexene, isobutylene, 3-methyl-1-octene, polybutadiene, polyisoprene, EPDM, oleic acid, linoleic acid, methyl oleate, a vinyl siloxane of the Formula VII, (VII)

$$\begin{array}{c}R^{14}\\|\\Si\!-\!O\!\left[\!\!\begin{array}{c}R^{14}\\|\\Si\!-\!O\\|\\R^{14}\end{array}\!\!\right]_{\!n}\!\!\begin{array}{c}R^{14}\\|\\Si\\|\\R^{14}\end{array}\end{array}$$

(IX)

or a combination of two or more thereof, wherein each occurrence of $R^{14}$ is independently a C1-C18 alkyl, C1-C18 substituted alkyl, vinyl, aryl, or a substituted aryl, and n is greater than or equal to zero.

In one embodiment, component (b) is chosen from a compound of the formula $R_aSiH_{4-a}$, $(RO)_aSiH_{4-a}$, $HSiR_a(OR)_{3-a}$, $R_3Si(CH_2)_f(SiR_2O)_kSiR_2H$, $(RO)_3Si(CH_2)_f(SiR_2O)_k SiR_2H$, $Q_uT_v T_p{}^H D_w D{}^H{}_x M{}^H{}_y M_z$, $R_3Si(CH_2)_nSiO-SiR_2(OSiR_2)_jOSiR_2H$, or combinations of two or more thereof where each occurrence of R is independently a C1-C18 alkyl, a C1-C18 substituted alkyl, wherein R optionally contains at least one heteroatom, each occurrence of a independently has a value from 0 to 3, f has a value of 1 to 8, k has a value of 0 to 3000, each of p, u, v, y and z independently has a value from 0 to 20, w and x are from 0 to 3000, provided that p+x+y equals 1 to 1000 and the valences of the all the elements in the silyl hydride are satisfied, M represents a monofunctional group of formula $R'_3SiO_{1/2}$, D represents a difunctional group of formula $R'_2SiO_{2/2}$, T represents a trifunctional group of formula $R'SiO_{3/2}$, Q represents a tetrafunctional group of formula $SiO_{4/2}$ an $M^H$ represents $HR'_2SiO_{1/2}$, $T^H$ represents $HSiO_{3/2}$, and $D^H$ represents $R'HSiO_{2/2}$; each occurrence of R' is independently C1-C18 alkyl, C1-C18 substituted alkyl, wherein R' optionally contains at least one heteroatom; his 1-8, and j is 0-10.

In one embodiment, the catalyst is present in an amount of from 0.01 mole percent to 10 mole percent based on the molar quantity of the unsaturated compound to be reacted.

In one embodiment, the process is conducted at a temperature of between about 0° C. and about 300° C.

In one embodiment, the complex is immobilized on a support. In one embodiment, the support is chosen from carbon, silica, alumina, MgCl$_2$, zirconia, polyethylene, polypropylene, polystyrene, poly(aminostyrene), sulfonated polystyrene, or a combination of two or more thereof.

In one aspect, the present invention provides a process for producing a hydrosilylated product comprising reacting a mixture comprising (a) an unsaturated compound containing at least one unsaturated functional group, (b) a silyl hydride containing at least one silylhydride functional group, and (c) a catalyst, optionally in the presence of a solvent, in order to produce the dehydrogenative silylated product, and/or hydrosilylated product wherein the catalyst is a complex of the Formula (I), (II), or a combination thereof;

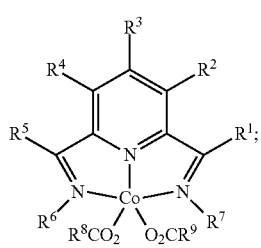

(I)

Co(carboxylate)$_2$;

(II)

wherein each occurrence of $R^1$, $R^2$, $R^3$, $R^4$, and $R^5$ is independently hydrogen, a C1-C18 alkyl, a C1-C18 substituted alkyl, an aryl, a substituted aryl, or an inert substituent, $R^1$-$R^5$, other than hydrogen, optionally contain at least one heteroatom;

each occurrence of $R^6$ and $R^7$ is independently a C1-C18 alkyl, a C1-C18 substituted alkyl, an aryl, or a substituted aryl, wherein $R^6$ and $R^7$ optionally contain at least one heteroatom;

optionally any two neighboring groups of $R^1$, $R^2$, $R^3$, $R^4$, $R^5$, $R^6$, and $R^7$ taken together may form a ring being a substituted or unsubstituted, saturated, or unsaturated cyclic structure;

$R^8$ and $R^9$ is each, independently, an alkyl or aryl group optionally containing at least one heteroatom; and wherein the carboxylate is derived from substituted or unsubstituted, straight-chain, branched or cyclic aliphatic carboxylic acid or aromatic carboxylic acid, and which may also contain one or more heteroatoms such as O, N, S, P, Si, F, Cl, Br, I.

In one embodiment, $R^8$ and $R^9$ are $CH_3$ such that the carboxylate groups are acetate.

In one embodiment, $R^8$ and $R^9$ are 3-heptyl such that the carboxylate groups are 2-ethylhexanoate.

In one embodiment, $R^6$ and $R^7$ are independently chosen from a C1-C10 alkyl. In one embodiment, $R^6$ and $R^7$ are each methyl. In one embodiment, $R^6$ and $R^7$ are each ethyl. In one embodiment, $R^6$ and $R^7$ are each cyclohexyl.

As described, any two neighboring groups of $R^1$, $R^2$, $R^3$, $R^4$, $R^5$, $R^6$, and $R^7$ may be taken to form a ring. This includes R groups that are vicinal to one another and R groups adjacent to one another but not on adjacent carbon atoms. In embodiments, $R^1$-$R^7$ and/or $R^5$-$R^6$ may be taken together to form a ring. In one embodiment, $R^1$-$R^7$ and $R^5$-$R^6$ taken together form a 5-membered heterocyclic ring structure with the imine nitrogen. In embodiments, $R^1$-$R^2$ and/or $R^4$-$R^5$ may be taken together to form a ring. In embodiments, the ring(s) formed from $R^1$-$R^7$ and/or $R^5$-$R^6$ may be formed from carbon atoms or may include other heteroatoms (besides the imine nitrogen atom). For example, the ring formed with the imine nitrogen may include oxygen, nitrogen, or other heteroatoms in the ring. In one embodiment, the ring formed $R^1$-$R^7$ and/or $R^5$-$R^6$ may be a five membered ring optional comprising one or more heteroatoms (other than the nitrogen from the imine group.

The metal carboxylate in Formula (II) may be anhydrous, a hydrated salt or may contain other solvents of crystallization. In embodiments, the metal carboxylate of Formula (II) is dissolved in a solvent. Suitable solvents include, but are not limited to, mineral spirits or an olefin material, e.g., an olefin similar to or the same as the substrate olefin for the reaction.

In one embodiment, component (a) is chosen from an olefin, a cycloalkene, an alkyl-capped allyl polyether, a vinyl-functional alkyl-capped allyl or methallyl polyether, an alkyl-capped terminally unsaturated amine, an alkyne, a terminally unsaturated acrylate or methacrylate, an unsaturated aryl ether, a vinyl-functionalized polymer or oligomer, a vinyl-functionalized silane, a vinyl-functionalized silicone, an unsaturated fatty acid, an unsaturated ester, or a combination of two or more thereof and component (b) is chosen from a compound of the formula $R_aSiH_{4-a}$, $(RO)_a$ $SiH_{4-a}$, $HSiR_a(OR)_{3-a}$, $R_3Si(CH_2)_f(SiR_2O)_kSiR_2H$, $(RO)_3Si$ $(CH_2)_f(SiR_2O)_kSiR_2H$, $Q_uT_vT_p{}^HD_w{}^HD_x{}^HM^H{}_yM_z$, $R_3Si(CH_2)_h$ $SiOSiR_2(OSiR_2)_jOSiR_2H$ and combinations of two or more thereof where each occurrence of R is independently a C1-C18 alkyl, a C1-C18 substituted alkyl, wherein R optionally contains at least one heteroatom, each occurrence of a independently has a value from 1 to 3, f has a value of 1 to 8, k has a value of 0 to 3000, each of p, u, v, y and z independently has a value from 0 to 20, w and x are from 0 to 500, provided that p+x+y equals 1 to 500 and the valences of the all the elements in the silyl hydride are satisfied, M represents a monofunctional group of formula $R'_3SiO_{1/2}$, a D represents a difunctional group of formula $R'_2SiO_{2/2}$, T represents a trifunctional group of formula $R'SiO_{3/2}$, Q represents a tetrafunctional group of formula $SiO_{4/2}$, an $M^H$ represents $HR'_2SiO_{1/2}$, $T^H$ represents $HSiO_{3/2}$, and $D^H$ represents $R'HSiO_{2/2}$; each occurrence of R' is independently a C1-C18 alkyl, a C1-C18 substituted alkyl, wherein R' optionally contains at least one heteroatom; h is 1-8, and j is 0-10.

In one embodiment, component (a) is chosen from a vinyl-functionalized silane, a vinyl-functionalized silicone, or a combination thereof.

In one embodiment, component (a) is chosen from a vinyl siloxane of the formula

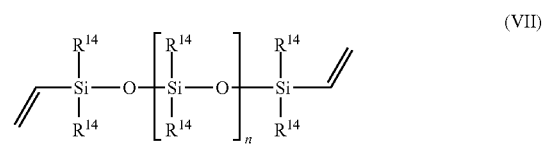

(VII)

wherein each occurrence of $R^{14}$ is independently a C1-C18 alkyl, a C1-C18 substituted alkyl, a vinyl, an aryl, a substituted aryl, and n is greater than or equal to zero.

In one embodiment, $R^6$ and $R^7$ are each methyl.

In one embodiment, component (b) comprises a trialkoxy silyl hydride.

In one embodiment, component (a) is chosen from an olefin, a cycloalkene, an alkyl-capped allyl polyether, a vinyl-functional alkyl-capped allyl or methallyl polyether, an alkyl-capped terminally unsaturated amine, an alkyne, a terminally unsaturated acrylate or methacrylate, an unsaturated aryl ether, a vinyl-functionalized polymer or oligomer, a vinyl-functionalized silane, a vinyl-functionalized silicone, an unsaturated fatty acid, an unsaturated ester, or a combination of two or more thereof.

In one embodiment, the catalyst is present in an amount of from 0.001 mole percent to 10 mole percent based on the molar quantity of the unsaturated compound to be reacted.

In one embodiment, the process is conducted at a temperature of between about 0° C. and about 300° C.

In one aspect, the present invention provides process for producing a crosslinked material, comprising reacting a mixture comprising (a) a silyl-hydride containing polymer, (b) an vinyl-substituted siloxane or an unsaturated polyolefin, or combinations thereof and (c) a catalyst, optionally in the presence of a solvent, in order to produce the crosslinked material, of the Formula (I) or an adduct thereof; Formula (II), or a combination of two or more thereof:

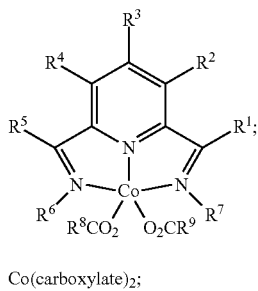

(I)

Co(carboxylate)$_2$; (II)

wherein each occurrence of R$^1$, R$^2$, R$^3$, R$^4$, and R$^5$ is independently chosen from hydrogen, a C1-C18 alkyl, a C1-C18 substituted alkyl, an aryl, a substituted aryl, or an inert substituent, where R$^1$-R$^5$, other than hydrogen, may optionally contain at least one heteroatom;

each occurrence of R$^6$ and R$^7$ is independently chosen from a C1-C18 alkyl, a C1-C18 substituted alkyl, an aryl, or a substituted aryl, where R$^6$ and R$^7$ may optionally contain at least one heteroatom;

optionally any two neighboring groups of R$^1$, R$^2$, R$^3$, R$^4$, R$^5$, R$^6$, and R$^7$ taken together may form a ring being a substituted or unsubstituted, saturated, or unsaturated cyclic structure;

R$^8$ and R$^9$ is each independently, chosen from an alkyl or aryl group optionally containing at least one heteroatom; and the carboxylate is derived from substituted or unsubstituted, straight-chain, branched or cyclic aliphatic carboxylic acid or aromatic carboxylic acid, and which optionally contains one or more heteroatoms chosen from O, N, S, P, Si, F, Cl, Br, I, or a combination of two or more thereof;

wherein the mixture is free of a reducing agent and a promoter.

In one embodiment, R$^8$ and R$^9$ are CH$_3$ such that the carboxylate groups are acetate.

In one embodiment, R$^8$ and R$^9$ are 3-heptyl such that the carboxylate groups are 2-ethylhexanoate.

In one embodiment, R$^6$ and R$^7$ are independently chosen from a C1-C10 alkyl. In one embodiment, R$^6$ and R$^7$ are each methyl. In one embodiment, R$^6$ and R$^7$ are each ethyl. In one embodiment, R$^6$ and R$^7$ are each cyclohexyl.

In one embodiment, R$^1$-R$^7$ and R$^5$-R$^6$ taken together form a 5-membered heterocyclic ring structure with the imine nitrogen.

In one embodiment, the reaction is conducted under an inert atmosphere.

In one embodiment, the reaction is conducted in the presence of a solvent selected from the group consisting of hydrocarbons, halogenated hydrocarbons, ethers, and combinations thereof.

In one embodiment, the reaction is carried out at a temperature of 0° C. to 300° C.

In one embodiment, the catalyst is present in an amount of from about 0.01 mol % to about 5 mol %.

DETAILED DESCRIPTION OF THE INVENTION

The present technology provides non-precious metal-based catalysts that are effective for catalyzing dehydrogenative silylation, hydrosilylation, or both. The catalysts have been found to be suitable for catalyzing such reactions without the need for pre-activating the catalyst (e.g., during formation of the complex) or without the need for a strong reducing agent or activator during the process. The present technology also provides silylation processes employing such catalysts.

Reference will now be made to various embodiments. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used in the instant application, the term "alkyl" includes straight, branched, and cyclic alkyl groups. Specific and non-limiting examples of alkyls include, but are not limited to, methyl, ethyl, propyl, hexyl, octyl, and isobutyl. In embodiments, the alkyl group is chosen from a C1-C30 alkyl, a C1-C18 alkyl, a C2-C10 alkyl, even a C4-C6 alkyl. In embodiments, the alkyl is chosen from a C1-C6 alkyl.

As used herein, the term "substituted alkyl" refers to an alkyl group that contains one or more substituent groups that are inert under the process conditions to which the compound containing these groups is subjected. The substituent groups also do not substantially interfere with the hydrosilylation and dehydrogenative silylation processes described herein. In some embodiments, the substituted alkyl group is a C1-C18 substituted alkyl. In other embodiments, it is a C1-C10 substituted alkyl. The substituents for the alkyl include, but are not limited to, the inert functional groups described herein.

As used herein, the term "aryl" refers to a non-limiting group of any aromatic hydrocarbon from which one hydrogen atom has been removed. An aryl may have one or more aromatic rings, which may be fused, or connected by single bonds or other groups. Specific and non-limiting examples of aryls include, but are not limited to, tolyl, xylyl, phenyl, and naphthalenyl. In embodiments, an aryl group may be chosen from a C6-C30 aryl, a C6-C20 aryl, even a C6-C10 aryl.

As used herein, the term "substituted aryl" refers to an aromatic group that contains one or more substituent groups that are inert under the process conditions to which the compound containing these substituent groups is subjected. The substituent groups also do not substantially interfere with the hydrosilylation and dehydrogenative processes described herein. Similar to an aryl, a substituted aryl may have one or more aromatic rings, which may be fused, connected by single bonds or other groups; however, when the substituted aryl has a heteroaromatic ring, the free valence in the substituted aryl group can be to a heteroatom (such as nitrogen) of the heteroaromatic ring instead of a carbon. If not otherwise stated, the substituents of the substituted aryl groups may contain 0 to about 30 carbon atoms, specifically from 0 to 20 carbon atoms, more specifically, from 0 to 10 carbon atoms. In one embodiment, the substituents are chosen from the inert groups described herein.

As used herein, the term "alkenyl" refers to any straight, branched, or cyclic alkenyl group containing one or more carbon-carbon double bonds, where the point of substitution can be either at a carbon-carbon double bond or elsewhere in the group. Specific and non-limiting examples of alkenyls include, but are not limited to, vinyl, propenyl, allyl, methallyl, and ethylidenyl norbornane.

As used herein, the term "alkaryl" refers to an aryl group comprising one or more alkyl substituents. Non-limiting examples of alkarlyl compounds include tolyl, xylyl, etc.

As used herein, the term "aralkyl" refers to an alkyl group in which one or more hydrogen atoms have been substituted by the same number of aryl groups, which aryl groups may be the same or different from one another. Non-limiting examples of aralkyls include benzyl and phenylethyl.

In accordance with aspects and embodiments of the present invention, a process for producing a silylated product comprises reacting a mixture comprising (a) an unsaturated compound containing at least one unsaturated functional group, (b) a silyl hydride containing at least one silylhydride functional group, and (c) a catalyst, optionally in the presence of a solvent, to produce a dehydrogenative silylated product, a hydrosilylated product, or a combination of a dehydrogenative silylated product and a hydrosilylated product, wherein the catalyst is a complex of the Formula (I) or an adduct thereof; Formula (II) or an adduct thereof, or a combination of two or more thereof:

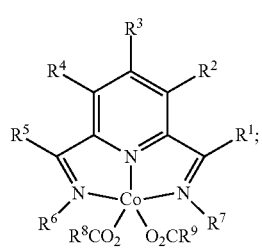

(I)

Co(carboxylate)$_2$;

(II)

wherein each occurrence of $R^1$, $R^2$, $R^3$, $R^4$, and $R^5$ is independently chosen from hydrogen, a C1-C18 alkyl, a C1-C18 substituted alkyl, an aryl, a substituted aryl, or an inert substituent, where $R^1$-$R^5$, other than hydrogen, may optionally contain at least one heteroatom;

each occurrence of $R^6$ and $R^7$ is independently chosen from a C1-C18 alkyl, a C1-C18 substituted alkyl, an aryl, or a substituted aryl, where $R^6$ and $R^7$ may optionally contain at least one heteroatom;

optionally any two neighboring groups of $R^1$, $R^2$, $R^3$, $R^4$, $R^5$, $R^6$, and $R^7$ taken together may form a ring being a substituted or unsubstituted, saturated, or unsaturated cyclic structure;

$R^8$ and $R^9$ is each independently, chosen from an alkyl or aryl group optionally containing at least one heteroatom, or $R^8$ and $R^9$ may be connected (such as to provide a dicarboxylate group); and wherein the carboxylate is derived from substituted or unsubstituted, straight-chain, branched or cyclic aliphatic carboxylic acid or aromatic carboxylic acid, and which may also contain one or more heteroatoms such as O, N, S, P, Si, F, Cl, Br, I.

In embodiments, the process comprises a catalyst of Formula (I), and $R^8$ and $R^9$ are independently chosen from a C1-C10 alkyl group. In embodiments, $R^8$ and $R^9$ are the same. In embodiments, $R^8$ and $R^9$ are different from one another. In embodiments, $R^8$ and $R^9$ are independently chosen from a C1-C7 alkyl group; a C1-C6 alkyl group; even a C2-C4 alkyl group. The alkyl groups may be linear or branched.

In one embodiment, $R^8$ and $R^9$ are CH$_3$ such that the carboxylate groups are acetate. In one embodiment, $R^8$ and $R^9$ are 3-heptyl such that the carboxylate groups are 2-ethylhexanoate.

In embodiments, where the catalyst is of Formula (I) $R^6$ and $R^7$ are independently chosen from a C1-C10 alkyl. In embodiments, $R^6$ and $R^7$ are the same. In embodiments, $R^6$ and $R^7$ are different from one another. In one embodiment, $R^6$ and $R^7$ are each methyl. In one embodiment, $R^6$ and $R^7$ are each ethyl. In one embodiment, $R^6$ and $R^7$ are each cyclohexyl.

In one embodiment, where the catalyst is chosen from a complex of Formula (I), $R^1$-$R^7$ and $R^5$-$R^6$ are respectively taken together to form a ring. The ring is a heterocyclic ring comprising the imine nitrogen. In embodiments, the ring may be a 5-10 membered ring. It will be appreciated that the ring formed by $R^1$-$R^7$ and $R^5$-$R^6$ is an unsaturated ring comprising at least one unsaturated bond. In embodiments, the ring formed by $R^1$-$R^7$ and $R^5$-$R^6$ is a 5-membered heterocyclic ring structure with the imine nitrogen. In other embodiments, the ring formed by $R^1$-$R^7$ and $R^5$-$R^6$ is a 6-membered heterocyclic ring structure with the imine nitrogen. In one embodiment, the ring formed by $R^1$-$R^7$ and $R^5$-$R^6$ is a pyridine ring. The ring(s) formed from $R^1$-$R^7$ and/or $R^5$-$R^6$ may be formed from carbon atoms or may include other heteroatoms (besides the imine nitrogen atom). For example, the ring formed with the imine nitrogen may include oxygen, nitrogen, or other heteroatoms in the ring. Non-limiting examples of compounds that may be used as the catalyst are:

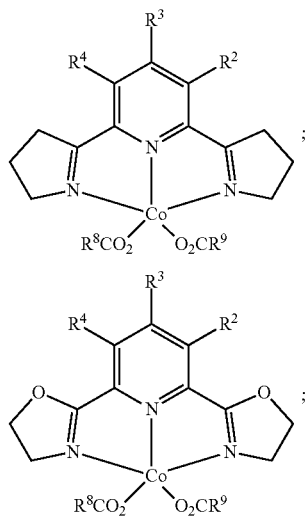

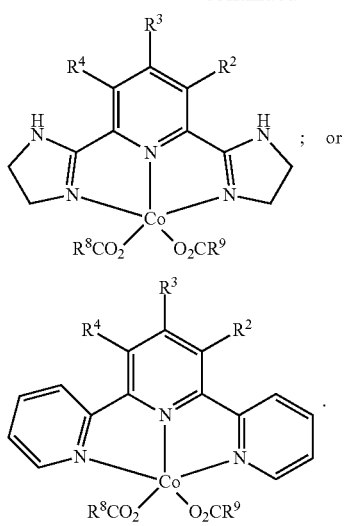

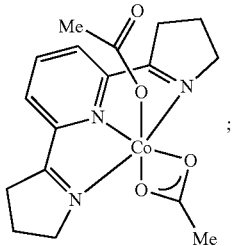

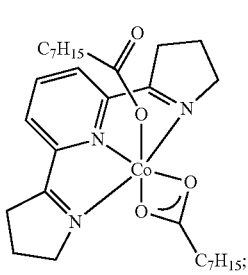

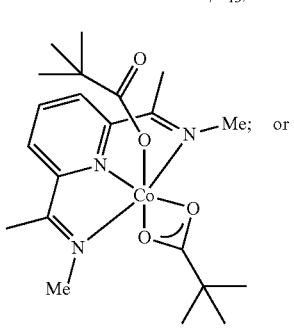

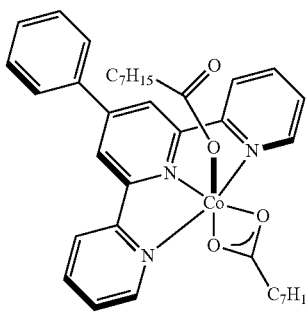

It will be appreciated that the atoms in the rings may be unsubstituted (as shown) or may comprise a substituent group (e.g., C1-C10 alkyl, aryl, etc.). In embodiments, $R^2$-$R^4$ are independently chosen from hydrogen, a C1-C10 alkyl, and a C6-C10 aryl.

In embodiments where the catalyst is of the Formula (I) and/or (II), $R^1$-$R^5$ may be the same or different. In embodiments of Formula (I), $R^1$-$R^5$ are each hydrogen. In embodiments of Formula (I), each of $R^2$-$R^4$ is hydrogen and $R^1$ and $R^5$ are each a C1-C18 alkyl. In embodiments, $R^2$-$R^4$ is each hydrogen, and $R^1$ and $R^5$ are each a C1-C6 alkyl. In embodiments, $R^1$ and $R^5$ are each methyl.

Without being bound to any particular theory, the coordination of the carboxylate groups to the Co center in Formula (I) may be kappa-1 coordination or kappa-2 coordination.

Some non-limiting examples of suitable catalysts of Formula (I) include:

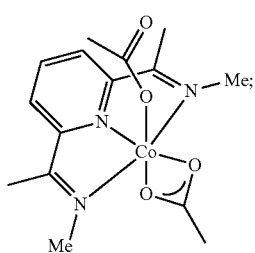

(III)

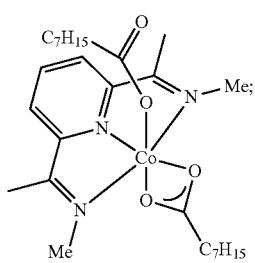

(IV)

For catalysts of Formula (II), the carboxylic acid to form the carboxylate is not particularly limited and may be chosen as desired for a particular purpose or intended application. Any carboxylic acid having from about 2 to about 18 carbons may be used to prepare the Co-carboxylates. Examples of suitable carboxylic acids to form the carboxylate include, but are not limited to, acetic acid, propionic acid, hexanoic acid, nonanoic acid, decanoic acid, neodecanoic acid, naphthoic acid, linoleic acid, naphhenic acid, tall oil acid, 2-methyl valeric acid, etc.

The metal carboxylate in Formula (II) may be anhydrous, a hydrated salt or may contain other solvents of crystallization. In embodiments, the metal carboxylate of Formula (II) is dissolved in a solvent. Suitable solvents include, but are not limited to, mineral spirits or an olefin material, e.g., an olefin similar to or the same as the substrate olefin for the reaction.

In accordance with the present process, the process is conducted in the absence of an external reducing agent or promoter. Thus, the catalyst is not specially activated (i) during the formation of the catalyst, e.g., via a strong reducing agent, or (ii) by a separate activator or promoter to promote or initiate catalytic activity. Rather, it has been found that the present catalysts catalyze hydrosilylation reactions in the presence of the unsaturated compound (a) and silyl hydride (b) without having been (i) pre-activated" such as by a strong reducing agent, or (ii) activated in-situ by an activating agent or promoter.

Without being bound to any particular theory, the catalysts may be activated by a silylhydride including the silylhydride (b). However, the present process does not require or employ a promoter or activator other than or external to the silyl hydride.

As previously described, the catalysts are not activated during formation. For example, PDI type catalysts are often made by reacting the PDI complex with a Gringard reagent or strong reducing agent such as an alkyl lithium complex. The complexes of Formula (I) are formed by reacting a PDI-type compound directly with a cobalt dicarboxylate complex optionally in the presence of a solvent at room temperature. The catalysts may be unsupported or immobilized on a support material. The catalysts can be supported or immobilized on a support material, for example, carbon, silica, alumina, MgCl$_2$ or zirconia, or on a polymer or prepolymer, for example polyethylene, polypropylene, polystyrene, or poly(aminostyrene). The metal complexes can also be supported on dendrimers In some embodiments, for the purposes of attaching the catalyst precursors of the invention to a support, it is desirable that at least one of $R^1$ to $R^7$ of the metal complexes, has a functional group that is effective to covalently bond to the support. Exemplary functional groups include but are not limited to SH, COOH, NH$_2$, or OH groups.

In certain embodiments, silica supported catalyst precursors may be prepared via Ring-Opening Metathesis Polymerization (ROMP) technology as discussed in the literature, for example Kroll, R.; Eshbaumer, C.; Schubert, U. S.; Buchmeiser, M. R.; Wurst, K. *Macromol. Chem. Phys.* 2001, 202, 645.; Glatz, I.; Mayr, M.; Hoogenboom, R.; Schubert, U. S.; Buchmeiser, M. R. *J. Chromatogr.* A 2003, 1015, 65. In some embodiments, the catalyst precursors can be immobilized on the surface of dendrimers by the reaction of Si—Cl bonded parent dendrimers and functionalized PDI in the presence of a base is as illustrated by Kim, C.; Kim, H. *J. Organomet. Chem.* 2003, 673, 77.

The compound containing an unsaturated group employed in the silylation reaction may be chosen as desired for a particular purpose or intended application. Examples of suitable materials for the compound containing an unsaturated group include, but are not limited to, unsaturated polyethers such as alkyl-capped allyl polyethers, vinyl functionalized alkyl capped allyl or methallyl polyether; terminally unsaturated amines; alkynes; C2-C18 olefins, preferably alpha olefins; internal olefins; unsaturated cycloalkyl epoxide such as vinyl cyclohexyl epoxide; terminally unsaturated acrylates or methyl acrylates; unsaturated aryl ethers; unsaturated aromatic hydrocarbons; unsaturated cycloalkanes such as trivinyl cyclohexane; unsaturated esters and acids; vinyl-functionalized polymer or oligomer; alkenyl-functional silanes, an alkenyl-functional silicones, and vinyl-functionalized silanes and vinyl-functionalized silicones.

In one embodiment, component (a) is chosen from an olefin, a cycloalkene, an unsaturated polyether, a vinyl-functional alkyl-capped allyl or methallyl polyether, an alkyl-capped terminally unsaturated amine, an alkyne, a terminally unsaturated acrylate or methacrylate, an unsaturated aryl ether, a vinyl-functionalized polymer or oligomer, a vinyl-functionalized silane, a vinyl-functionalized silicone, an unsaturated fatty acid, an unsaturated ester, or a combination of two or more thereof.

Unsaturated polyethers suitable as component (a) include, for example, a compound of the formula:

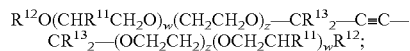

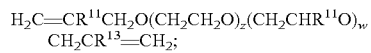

or a combination of two or more thereof, wherein $R^{10}$ is chosen from an unsaturated organic group containing from 2 to 10 carbon atoms; $R^{12}$ is chosen from hydrogen, a vinyl group, or a polyether capping group of from 1 to 8 carbon atoms; each occurrence of $R^{11}$ is independently chosen from a monovalent hydrocarbon group having 1-20 carbon atoms, an aryl group, an alkaryl, an aralkyl, a cycloalkyl group; each occurrence of $R^{13}$ is independently chosen from hydrogen, a monovalent hydrocarbon group having 1-20 carbon atoms, an aryl group, an alkaryl group, an aralkyl group, or a cycloalkyl group; each occurrence of z is 0 to 100 inclusive; and, each occurrence of w is 0 to 100 inclusive.

Examples of specific compounds useful in the present process as component (a) include, but are not limited to, N,N-dimethylallyl amine, allyloxy-substituted polyethers, propylene, 1-butene, 1-hexene, styrene, vinylnorbornane, 5-vinyl-norbornene, 1-octadecene, cyclopentene, cyclohexene, norbornene, 3-hexene, isobutylene, 3-methyl-1-octene, polybutadiene, polyisoprene, EPDM, oleic acid, linoleic acid, methyl oleate, allyl glycidyl ether, 1,2-epoxy-4-vinyl-cyclohexane, a vinyl siloxane of the Formula VII,

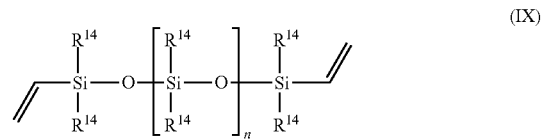

or a combination of two or more thereof, wherein each occurrence of $R^{14}$ is independently a C1-C18 alkyl, C1-C18 substituted alkyl, vinyl, aryl, or a substituted aryl, and n is greater than or equal to zero.

When the unsaturation is olefinic, it is desirably terminal to facilitate smooth hydrosilylation. However, when the unsaturation is a triple bond, it may be internal. $R^{12}$ is vinyl, or a polyether capping group of from 1 to 8 carbon atoms such as the alkyl groups: CH$_3$, n-C$_4$H$_9$, t-C$_4$H$_9$ or i-C$_8$H$_{17}$, the acyl groups such as CH$_3$COO, t-C$_4$H$_9$COO, the beta-ketoester group such as CH$_3$C(O)CH$_2$C(O)O, or a trialkyl-silyl group. $R^{11}$ and $R^{13}$ are monovalent hydrocarbon groups such as the C1-C20 alkyl groups, for example, methyl, ethyl, isopropyl, 2-ethylhexyl, dodecyl and stearyl, or the aryl groups, for example, phenyl and naphthyl, or the alkaryl groups, for example, benzyl, phenylethyl and nonylphenyl, or the cycloalkyl groups, for example, cyclohexyl and cyclooctyl. $R^{13}$ may also be hydrogen. Methyl is the most preferred $R^{11}$ and $R^{13}$ groups. $R^{12}$ is vinyl, or a polyether capping group of from 1 to 8 carbon atoms as defined herein above. Each occurrence of z is 0 to 100 inclusive and each occurrence of w is 0 to 100 inclusive. Preferred values of z and w are 1 to 50 inclusive.

The silylhydride (b) employed in the hydrosilylation reaction is not particularly limited. It can be chosen from a compound of the formula $R_aSiH_{4-a}$, $(RO)_aSiH_{4-a}$, $HSiR_a(OR)_{3-a}$, $R_3Si(CH_2)_f(SiR_2O)_kSiR_2H$, $(RO)_3Si(CH_2)_f(SiR_2O)_k$ $SiR_2H$, $Q_uT_vT_p^H D_w D^H_x M^H_y M_z$, $R_3Si(CH_2)_hSiO-SiR_2(OSiR_2)_jOSiR_2H$, or combinations of two or more thereof. Each occurrence of R is independently a C1-C18 alkyl, a C1-C18 substituted alkyl, wherein R optionally contains at least one heteroatom, each occurrence of a independently has a value from 0 to 3, f has a value of 1 to 8, k has a value of 0 to 3000, each of p, u, v, y and z independently has a value from 0 to 20, w and x are from 0 to 3000, provided that p+x+y equals 1 to 1000 and the valences of the all the elements in the silyl hydride are satisfied. As used herein, M represents a monofunctional group of formula $R'_3SiO_{1/2}$, D represents a difunctional group of formula $R'_2SiO_{2/2}$, T represents a trifunctional group of formula $R'SiO_{3/2}$, Q represents a tetrafunctional group of formula $SiO_{4/2}$, an $M^H$ represents $HR'_2SiO_{1/2}$, $T^H$ represents $HSiO_{3/2}$, and $D^H$ represents $R'HSiO_{2/2}$; each occurrence of R' is independently C1-C18 alkyl, C1-C18 substituted alkyl, wherein R' optionally contains at least one heteroatom; h is 1-8, and j is 0-10.

The metal complexes of the invention can also be used in a process for preparing a silylated polyurethane, which includes the step of contacting a terminally unsaturated polyurethane polymer with a silylhydride in the presence of a complex of Formula (I), (II), or (III).

In one aspect, the present invention provides a process for producing a crosslinked material, comprising reacting a mixture comprising (a) a silyl-hydride containing polymer, (b) an olefinically-substituted siloxane or an unsaturated polyolefin, or combinations thereof and (c) a catalyst, optionally in the presence of a solvent, in order to produce the crosslinked material, wherein the catalyst is a complex of the Formula (I) or an adduct thereof, Formula (II), or a combination of two or more thereof.

The order of addition for the unsaturated compound and the silyl hydride is not limited. In embodiments, the catalyst and unsaturated compound are provided as a mixture, and the silyl hydride is added to that mixture. In other embodiments, the unsaturated compound is added to a mixture of the catalyst and silyl hydride, which may be referred to herein as inverse mode addition. In accordance with the present technology, it has been found that inverse mode addition is particularly suitable and may provide a process that produces reduced or minimal levels of isomers.

The silylhydride (b) and the unsaturated compound (a) may be mixed in a unsaturated compound: silylhydride molar ratio of ranging from about 5:1 to about 1:4, about 3:1 to about 1:3; from about 2:1 to about 1:2; and even in a molar ratio of 1:1 of the reactive groups. In embodiments, the molar ratio of silylhydride (b) to unsaturated compound (a) is 4:1, 2:1, even 1.6:1. Here as elsewhere in the specification and claims, numerical values may be combined to form new and non-disclosed ranges.

The hydrosilylation and dehydrogenative silylation process of the present invention can be done with or without a solvent, but is advantageously done solvent-free. Hydrocarbon solvents such as, but not limited to, hexane, cyclohexane, benzene, toluene and xylene can be used.

Effective catalyst usage for hydrosilylation and dehydrogenative silylation ranges from 0.001 mole percent to 10 mole percent based on the molar quantity of the alkene to be reacted; 0.01 to about 5 mole percent; even 0.1 to 2.5 mole percent. Particularly suitable catalyst levels are from 0.1 to 5 mole percent. In still another embodiment, the catalyst level is from 0.2 mole percent to 1 mole percent. In still other embodiments, the catalyst is present in an amount of 1 ppm to 5% based on the total weight of the reactants. The reaction may be run at temperatures from about 0° C. up to 300° C., depending on the thermal stability of the alkene, silyl hydride and the specific pyridine diimine complex. In embodiments, the reactions are run at temperatures of from about 0 to about 150° C., from about 20 to about 100° C., about 20 to about 80° C. even from about 60 to about 80° C. In embodiments, the reaction temperature may be from about 60 to about 100° C.; even about 80 to about 100° C. Sensitivity to dehydrogenative silylation is more pronounced at the lower temperatures of this range. Heating of reaction mixtures can be done using conventional methods as well as with microwave devices.

The hydrosilylation and dehydrogenative silylation reactions of this invention can be run at sub-atmospheric and supra-atmospheric pressures. Typically, pressures from about 1 atmosphere (0.1 MPa) to about 50 atmospheres (5.1 MPa) are suitable. Higher pressures are effective with volatile and/or less reactive alkenes which require confinement to enable high conversions.

A variety of reactors can be used in the process of this invention. Selection is determined by factors such as the volatility of the reagents and products. Continuously stirred batch reactors are conveniently used when the reagents are liquid at ambient and reaction temperature. With gaseous olefins, fixed-bed reactors and autoclave reactors can be more suitable.

The following examples are intended to illustrate, but in no way limit the scope of the present invention. All parts and percentages are by weight and all temperatures are in degrees Celsius unless explicitly stated otherwise. All the publications, patents, and published applications referred to herein are each incorporated by reference herein in their entireties.

EXPERIMENTAL AND EXAMPLES

General Considerations

All air and moisture sensitive manipulations were carried out using standard vacuum line, Schlenk, and cannula techniques or in an MBraun inert atmosphere dry box containing an atmosphere of purified nitrogen. Solvents for air and moisture sensitive manipulations were initially dried and deoxygenated using literature procedures (Pangborn, A. B. et al., *Organometallics* 1996, 15, 11518). Chloroform-d and benzene-d6 were purchased from Cambridge Isotope Laboratories. $^{Mes}$PDI was prepared according to the literature procedure (Grol, C., Alt, H. G. *J. Mol. Catal. A: Chem.* 2007, 273, 118). Bis(trimethylsiloxy)methylsilane ($MD^HM$), $(EtO)_3SiH$ and $Et_3SiH$ were acquired from Momentive Performance Materials, dried over calcium hydride and distilled under reduced pressure prior to use. 1-Octene and allyl glycidyl ether were purchased from Aldrich, dried over calcium hydride and distilled under reduced pressure before use. Sodium 2-ethylhexanoate was purchased from Alfa Aesar and dried under high vacuum for 12 hours prior to use. Tetrabutylammonium acetate was purchased from Aldrich and dried via azeotropic distillation with toluene followed by high vacuum for 12 hours prior to use. SilForce® SL6100 ($M^{vi}D_{120}M^{vi}$), SilForce® SL6020 ($MD_{15}D^H_{30}M$) and allyl polyether (Y10227) were acquired from Momentive Performance Materials and dried under high vacuum for 12 hours before use.

$^1$H NMR spectra were recorded using Bruker ADVANCE 300 and 500 spectrometers operating at 300.13 MHz, and 500.62 MHz, respectively. Chemical shifts are reported in ppm with the solvent resonance as the internal standard (CDCl$_3$: 7.26 ppm or C$_6$D$_6$: 7.16 ppm). Data are reported as follows: chemical shift, integration, multiplicity (s=singlet, d=doublet, t=triplet, q=quartet, p=pentet, br=broad, m=multiplet, app=apparent), and coupling constants (Hz). Data for paramagnetic compounds are reported as follows: chemical shift, multiplicity, peak width at half height (Hz), and integration. $^{13}$C NMR spectra were recorded using a Bruker ADVANCE 500 spectrometer operating at 125.893 MHz. Chemical shifts are reported in ppm with the solvent resonance as the internal standard (CDCl$_3$: 77.16 ppm or C$_6$D$_6$: 128.06 ppm). GC analysis was performed using a Shimadzu GC-2010 gas chromatograph equipped with a Shimadzu AOC-20s autosampler and a Shimadzu SHRX1-5MS capillary column (15 m×250 μm). The instrument was set to an injection volume of 1 μL, an inlet split ratio of 20:1, and inlet and detector temperatures of 250° C. and 275° C., respectively. UHP-grade helium was used as carrier gas with a flow rate of 1.82 mL/min. The temperature program used for all the analyses is as follows: 60.0° C., 1 min; 15° C./min to 250° C., 2 min.

Preparation of $^{Me}$APDI:

To a 500 mL round-bottomed flask equipped with stir bar was added 2,6-diacetylpyridine (10.0 g, 61.29 mmol), followed by activated 4 Å mol. sieves (0.5 g). Methylamine (as a 33% wt solution in ethanol from Aldrich, 38.2 mL, 306 mmol) was then added via syringe and the flask was sealed with a septum equipped with a small needle vent. After stirring at room temperature for 3.5 hours, an additional portion of methylamine solution (10.0 mL) was added and the resulting cloudy mixture was stirred for an additional 30 minutes at room temperature. The reaction mixture was filtered through a pad of Celite on a glass frit with the use of DCM (100 mL) to dissolve all solids. The resulting clear, yellow filtrate was concentrated under reduced pressure to give a white-yellow solid. The crude material was then recrystallized from hot hexane to afford a white solid which was subsequently dried overnight under high vacuum to give the product as a white solid (7.69 g, 66%). $^1$H NMR (500 MHz, C$_6$D$_6$): δ=8.36 (2H, d, J=7.5 Hz), 7.22 (1H, t, J=7.5 Hz), 3.21 (6H, s), 2.22 (6H, s). $^{13}$C NMR (125 MHz, C$_6$D$_6$): δ=167.5, 156.5, 136.5, 121.2, 39.7, 12.8.

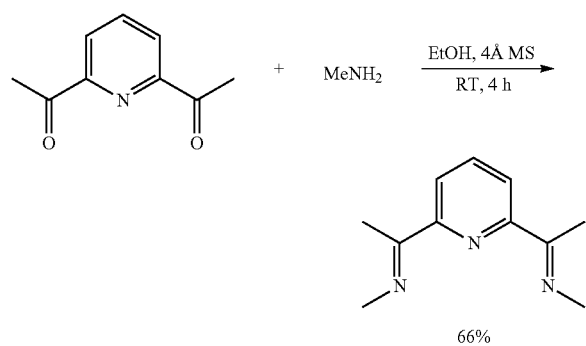

66%

Preparation of ($^{Me}$APDI)Co(O$_2$CR)$_2$ Compounds

Example 1. Preparation of ($^{Me}$APDI)Co(OAc)$_2$

To a scintillation vial equipped with a stir bar in a nitrogen filled glove box was added $^{Me}$APDI (200 mg, 1.06 mmol) followed by anhydrous Co(OAc)$_2$ (187 mg, 1.06 mmol). Tetrahydrofuran (5 mL) was then added and the resulting light brown mixture was rapidly stirred at ambient temperature for 12 hours to produce a dark brown mixture. The solvent was removed under reduced pressure and the resulting brown solid material was suspended in diethyl ether and collected by filtration onto a glass frit with additional diethyl ether rinses. The solid was dried under vacuum to give the product as a light brown powder (261 mg, 67%). $^1$H NMR (300 MHz, CDCl$_3$, 23° C.): δ=90.49 (s, Δυ$_{1/2}$=69 Hz, 2H), 64.22 (s, Δυ$_{1/2}$=121 Hz, 6H), 47.04 (s, Δυ$_{1/2}$=90 Hz, 6H), 16.42 (s, Δυ$_{1/2}$=58 Hz, 1H), −5.69 (s, Δυ$_{1/2}$=66 Hz, 6H). IR(powder) υ$_{CO2}$=1560 cm$^{-1}$. X-band EPR (10 K, toluene glass): g$_x$=2.1, g$_y$=2.4, g$_z$=2.0. Anal. for C$_{15}$H$_{21}$CoN$_3$O$_4$: calc.=C, 49.19; H, 5.78; N, 11.47. Found=C, 49.05; H, 5.63; N, 11.35.

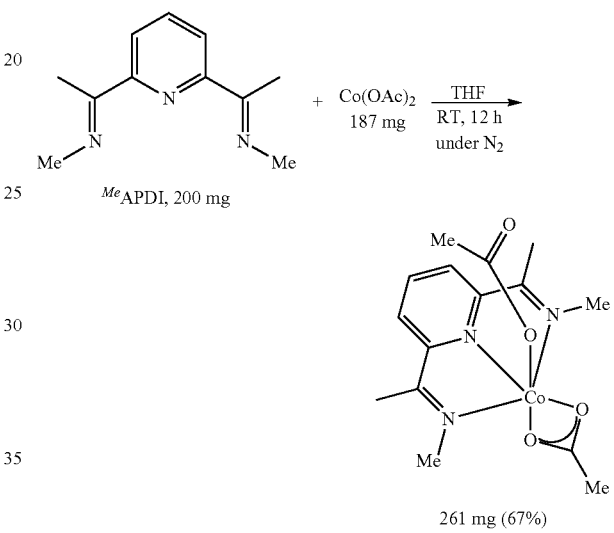

261 mg (67%)

Example 2. Preparation of ($^{Me}$APDI)Co(2-ethylhexanoate)$_2$

To a 250 mL round-bottomed flask equipped with a stir bar on the benchtop was added $^{Me}$APDI (1.00 g, 5.28 mmol) followed by toluene (50 mL) to give a clear, slightly yellow solution. Cobalt(II) 2-ethylhexanoate (as a 65 wt % solution in mineral spirits from Aldrich, 2.80 mL, 5.28 mmol) was then added in one portion via syringe and the resulting dark brown reaction mixture was rapidly stirred at room temperature for 1 hour. The flask was then equipped with a vacuum adapter and the solvent and mineral spirits were removed under reduced pressure. The resulting dark brown solid material was ground to a powder and further dried under high vacuum overnight to give the product as a medium brown powder (2.65 g, 94%). $^1$H NMR (300 MHz, CDCl$_3$, 23° C.): δ=92.89 (s, Δυ$_{1/2}$=33 Hz, 1H), 64.04 (s, Δυ$_{1/2}$=432 Hz, 1H), 51.21 (s, Δυ$_{1/2}$=94 Hz, 4H), 12.94 (s, Δυ$_{1/2}$=27 Hz, 1H), 11.41 (s, Δυ$_{1/2}$=343 Hz, 4H), 8.79 (s, Δυ$_{1/2}$=284 Hz, 4H), −0.77-4.02 (m, 24H), −7.69 (s, Δυ$_{1/2}$=20 Hz, 6H). IR(powder) υ$_{CO2}$=1551 cm$^{-1}$. X-band EPR (10 K, toluene glass): g$_x$=1.9, g$_y$=2.59, g, =2.06. Anal. for C$_{27}$H$_{45}$CoN$_3$O$_4$: calc.=C, 60.66; H, 8.48; N, 7.86. Found=C, 60.65; H, 8.37; N, 7.46. HRMS-(ESI) for C$_{27}$H$_{45}$CoN$_3$O$_4$ [M]$^+$: calculated: 534.2742, found: 534.2740.

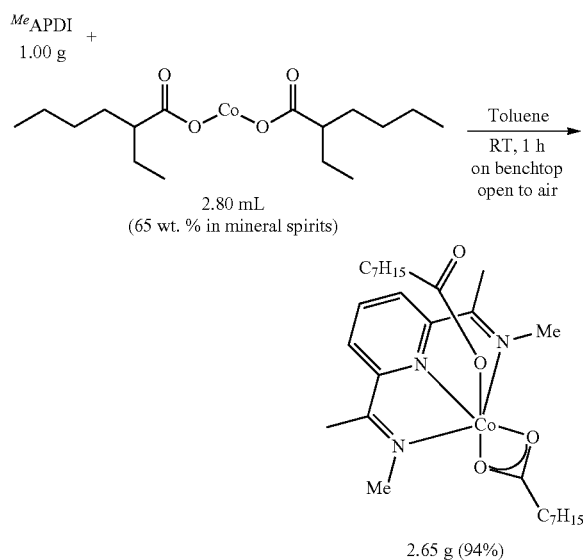

Example 3. Preparation of ($^{Me}$APDI)Co(OPiv)$_2$

To a scintillation vial equipped with stir bar in the glove box was added $^{Me}$APDI (200 mg, 1.06 mmol) followed by Co(OPiv)$_2$ (276 mg, 1.06 mmol). Tetrahydrofuran (8 mL) was added and the vial was sealed with a cap and stirred for 12 hours at room temperature. The resulting orange brown mixture was concentrated under reduced pressure followed by trituration of the resulting material with pentane to give the product as an orange powder (432 mg, 91%). Crystals suitable for x-ray diffraction were obtained from a tetrahydrofuran solution of the complex held at −35° C. for 24 hours. $^1$H NMR (300 MHz, CDCl$_3$, 23° C.): δ=87.12 (s, Δυ$_{1/2}$=32 Hz, 2H), 69.66 (s, Δυ$_{1/2}$=74 Hz, 6H), 18.59 (s, Δυ$_{1/2}$=17 Hz, 1H), 15.39 (s, Δυ$_{1/2}$=152 Hz, 18H), −5.12 (s, Δυ$_{1/2}$=16 Hz, 6H). IR(powder) υ$_{CO2}$=1601 cm$^{-1}$. Magnetic susceptibility: μ$_{eff}$ (magnetic susceptibility balance, 23° C.)=4.1 μB. Anal. for C$_{21}$H$_{33}$CoN$_3$O$_4$: calc.=C, 56.00; H, 7.38; N, 9.33. Found=C, 55.76; H, 7.24; N, 9.27.

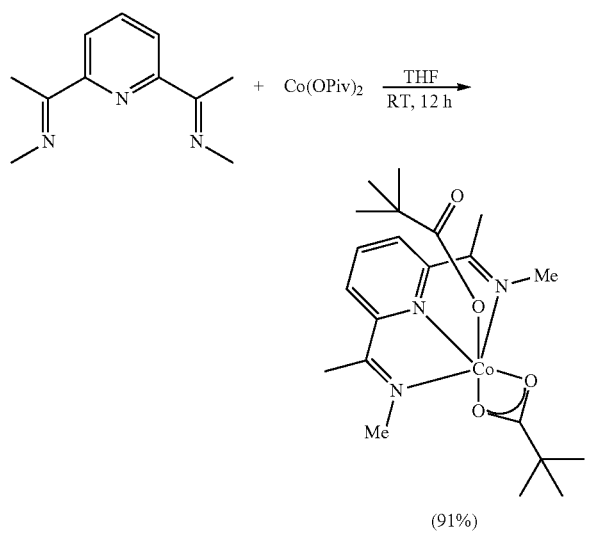

Preparation of ($^{TF}$APDI)Co(O$_2$CR)$_2$ Compounds

Example 4. Preparation of $^{TF}$APDI

Prepared according to the literature procedure (Bernauer, K.; Gretillat, F. *Helv. Chim. Acta* 1989, 72, 477-481) with slight modification. To a 250 mL round-bottomed flask equipped with stir bar was added dry THF (50 mL) followed by NaH (1.08 g, 45.0 mmol). The resulting mixture was cooled to 0° C. in an ice water bath and to the stirring mixture was added a solution of N-vinylpyrrolidin-2-one (3.50 g, 31.5 mmol) and dimethyl pyridine-2,6-dicarboxylate (2.93 g, 15.0 mmol) in dry THF (50 mL). The flask was equipped with a reflux condenser, warmed to room temperature and then to reflux with a heating mantel. After 45 minutes at reflux, the resulting bright yellow heterogeneous mixture was cooled to 0° C. in an ice water bath and aqueous HCl (20 mL, 3.5M) was slowly added. The THF was removed under reduced pressure and additional HCl (30 mL, 3.5M) was added. The reaction mixture was then heated to reflux with a heating mantel for 12 hours. The reaction mixture was cooled to room temperature, then to 0° C. in an ice water bath and aqueous NaOH (3M) was added until pH paper indicated a pH of greater than 12. DCM (100 mL) was added and the layers separated. The aqueous layer was further extracted with DCM (4×50 mL) and the combined organic layers were washed with brine (200 mL), dried over sodium sulfate, filtered, and concentrated under reduced pressure to give a light brown solid. Diethyl ether (200 mL) was added to the solid and stirred vigorously to give a yellow solution with brown insoluble material. The mixture was filtered on a glass frit and the filtrate was slowly concentrated to precipitate the product as an off-white solid. The solid was collected and dried overnight under high vacuum to give 904 mg (28%). All spectra were in agreement with reports in the literature.

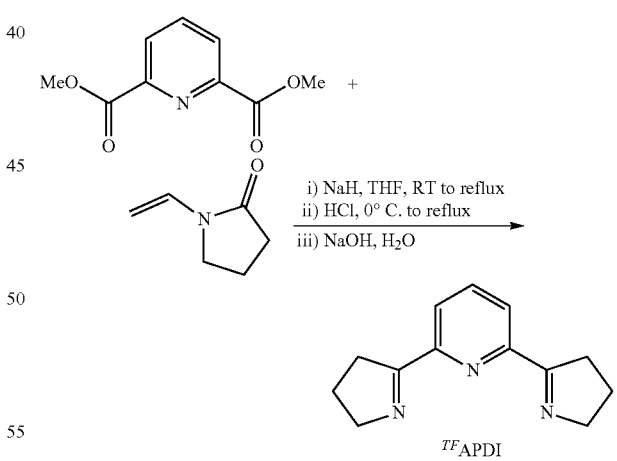

Example 5. Preparation of ($^{TF}$APDI)Co(OAc)$_2$

To a scintillation vial equipped with a stir bar in a nitrogen filled glove box was added $^{TF}$APDI (150 mg, 0.703 mmol) followed by anhydrous Co(OAc)$_2$ (124 mg, 0.703 mmol). Tetrahydrofuran (5 mL) was then added and the resulting light brown mixture was rapidly stirred at ambient temperature for 12 hours to produce a medium brown mixture. The solvent was removed under reduced pressure and the resulting brown solid material was suspended in diethyl ether and collected by filtration onto a glass frit with additional diethyl ether rinses. The solid was dried under vacuum to yield the product as a tan powder (128 mg, 47%). $^1$H NMR (300 MHz, CDCl$_3$, 23° C.): δ=70.80 (s, Δυ$_{1/2}$=18 Hz, 2H), 54.52 (s, Δυ$_{1/2}$=54 Hz, 6H), 9.19 (s, Δυ$_{1/2}$=16 Hz, 1H), −4.49 (s, Δυ$_{1/2}$=20 Hz, 4H), −12.50 (s, Δυ$_{1/2}$=67 Hz, 4H), −19.71 (s, Δυ$_{1/2}$=23 Hz, 4H).

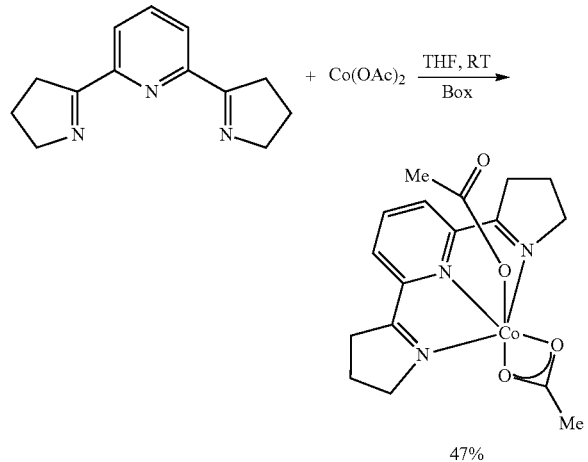

Example 6. Preparation of ($^{TF}$APDI)Co(2-ethylhexanoate)$_2$

To a 100 mL round-bottomed flask equipped with a stir bar on the benchtop was added $^{TF}$APDI (250 mg, 1.17 mmol) followed by toluene (20 mL) to give a clear, slightly yellow solution. Cobalt(II) 2-ethylhexanoate (as a 65 wt % solution in mineral spirits from Aldrich, 0.620 mL, 1.17 mmol) was then added in one portion via syringe and the resulting dark brown reaction mixture was rapidly stirred at room temperature for 1 hour. The flask was then equipped with a vacuum adapter and the solvent and mineral spirits were removed under reduced pressure. The resulting brown solid material was ground to a powder and further dried under high vacuum overnight to give the product as a medium brown powder (447 mg, 68%). $^1$H NMR (300 MHz, CDCl$_3$, 23° C.): δ=76.17 (s, Δυ$_{1/2}$=65 Hz, 2H), 71.12 (s, Δυ$_{1/2}$=27 Hz, 2H), 15.87, 15.77 (overlapping signals, 4H), 14.74 (s, Δυ$_{1/2}$=69 Hz, 4H), 7.35 (s, Δυ$_{1/2}$=22 Hz, 1H), 7.09 (s, Δυ$_{1/2}$=42 Hz, 2H), 5.17 (s, Δυ$_{1/2}$=34 Hz, 8H), 3.32 (s, 36 Hz, 2H), 2.92 (s, Δυ$_{1/2}$=36 Hz, 2H), 0.25 (s, Δυ$_{1/2}$=18 Hz, 6H), −7.38 (s, Δυ$_{1/2}$=26 Hz, 4H), −19.58 (s, Δυ$_{1/2}$=81 Hz, 4H), −21.18 (s, Δυ$_{1/2}$=30 Hz, 4H). Elemental microanalysis (C,H,N) for C$_{29}$H$_{45}$CoN$_3$O$_4$: Calculated C, 62.35, H, 8.12, N, 7.52; Found C: 62.01%, H: 7.98%, N: 7.39%.

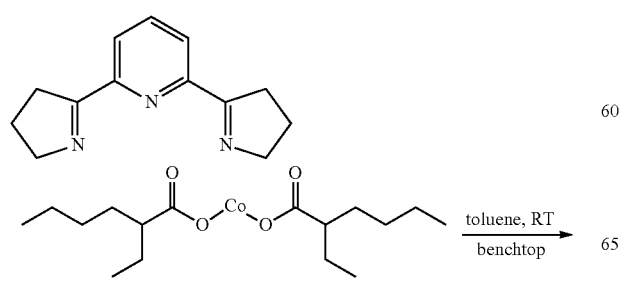

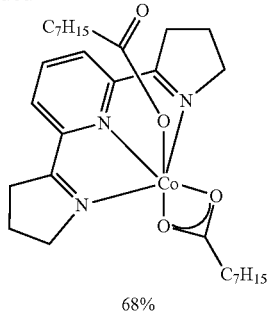

Example 7. Preparation of ($^{TF}$APDI)Co(OPiv)$_2$

To a scintillation vial equipped with stir bar in the glove box was added $^{TF}$APDI (200 mg, 0.938 mmol) followed by Co(OPiv)$_2$ (245 mg, 0.938 mmol). Tetrahydrofuran (8 mL) was added and the vial was sealed with a cap and stirred for 12 hours at room temperature. The resulting orange brown mixture was concentrated under reduced pressure followed by trituration of the resulting material with pentane to give the product as an orange-brown powder (432 mg, 91%). Crystals suitable for x-ray diffraction were obtained by carefully layering pentane over a tetrahydrofuran solution of the complex at room temperature. $^1$H NMR (300 MHz, CDCl$_3$, 23° C.): δ=68.18 (s, Δυ$_{1/2}$=21 Hz, 2H), 19.33 (s, Δυ$_{1/2}$=32 Hz, 18H), 10.55 (s, Δυ$_{1/2}$=16 Hz, 1H), −3.23 (s, Δυ$_{1/2}$=20 Hz, 4H), −11.21 (s, Δυ$_{1/2}$=69 Hz, 4H), −18.72 (s, Δυ$_{1/2}$=22 Hz, 4H). IR(powder) υ$_{CO2}$=1591 cm$^{-1}$. Magnetic susceptibility: μ$_{eff}$ (magnetic susceptibility balance, 23° C.)=4.0 μB. Anal. for C$_{23}$H$_{33}$CoN$_3$O$_4$: calc.=C, 58.22; H, 7.01; N, 8.86. Found=C, 58.00; H, 7.18; N, 8.70.

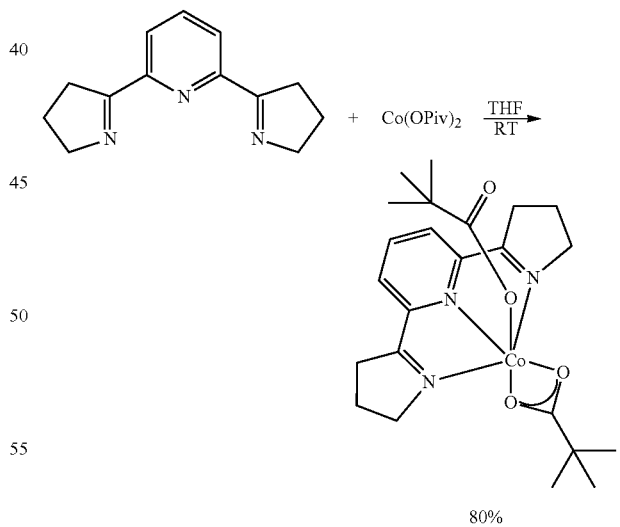

Preparation of ($^{4-Ph}$Terpy)Co(O$_2$CR)$_2$ Compounds

Example 8. Preparation of ($^{4-Ph}$Terpy)Co(2-ethylhexanoate)$_2$

To a 50 mL round-bottomed flask equipped with a stir bar on the benchtop was added $^{4-Ph}$Terpy (252 mg, 0.815 mmol)

followed by toluene (15 mL) to give a clear solution. Cobalt(II) 2-ethylhexanoate (as a 65 wt % solution in mineral spirits from Aldrich, 0.430 mL, 0.815 mmol) was then added in one portion via syringe and the resulting dark brown reaction mixture was rapidly stirred at room temperature for 1 hour. The flask was then equipped with a vacuum adapter and the solvent and mineral spirits were removed under reduced pressure. The resulting light brown solid material was ground to a powder and further dried under high vacuum overnight to give the product as a light brown powder (386 mg, 72%). $^1$H NMR (300 MHz, CDCl$_3$, 23° C.): δ=96.96 (s, $\Delta\upsilon_{1/2}$=246 Hz, 2H), 67.86 (s, $\Delta\upsilon_{1/2}$=154 Hz, 2H), 60.76 (s, $\Delta\upsilon_{1/2}$=185 Hz, 4H), 16.39 (s, $\Delta\upsilon_{1/2}$=129 Hz, 2H), 11.28, 10.91 (overlapping signals, 4H), 10.00 (s, $\Delta\upsilon_{1/2}$=137 Hz, 2H), 8.37 (s, $\Delta\upsilon_{1/2}$=185 Hz, 4H), 7.34 (s, $\Delta\upsilon_{1/2}$=180 Hz, 1H), 5.32 (s, $\Delta\upsilon_{1/2}$=119 Hz, 2H), 3.28 (s, $\Delta\upsilon_{1/2}$=119 Hz, 1H), 1.10, 0.66, 0.01, −0.60 (overlapping signals, 11H), −2.01 (s, $\Delta\upsilon_{1/2}$=97 Hz, 6H), −2.83 (s, $\Delta\upsilon_{1/2}$=171 Hz, 2H), −8.89 (s, $\Delta\upsilon_{1/2}$=199 Hz, 2H).

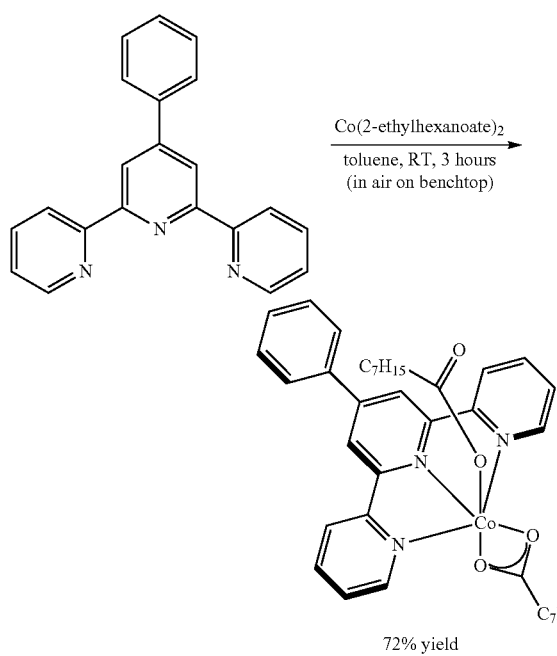

72% yield

Example 9. Procedure for Hydrosilylation of 1-octene with Triethoxysilane and ($^{Me}$APDI)Co(2-ethylhexanoate)$_2$ To a scintillation vial equipped with a stir bar in a nitrogen filled glovebox was added ($^{Me}$APDI)Co(2-ethylhexanoate)$_2$ (3 mg, 0.006 mmol) followed by 1-octene (100 mg, 0.891 mmol) to give a heterogeneous mixture. Triethoxysilane (146 mg, 0.891 mmol) was then added resulting in formation of a dark reaction mixture. The vial was sealed with a cap, removed from the glove box and stirred at room temperature for 22 hours. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (240 mg, 97%). The product distribution was determined by analysis of the $^1$H NMR spectrum of the isolated product and comparison to authentic material.

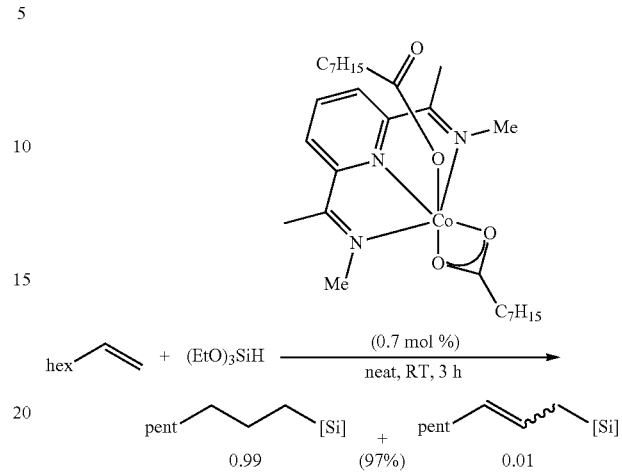

Example 10. Procedure for Hydrosilylation of 1-octene with MD$^H$M and ($^{Me}$APDI)Co(2-ethylhexanoate)$_2$ To a scintillation vial equipped with a stir bar in a nitrogen filled glovebox was added ($^{Me}$APDI)Co(2-ethylhexanoate)$_2$ (5 mg, 0.009 mmol) followed by 1-octene (100 mg, 0.891 mmol) to give a heterogeneous mixture. MD$^H$M (198 mg, 0.891 mmol) was then added and the vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (18 mg, 7%). The product distribution was determined by analysis of the $^1$H NMR spectrum of the isolated product and comparison to authentic material.

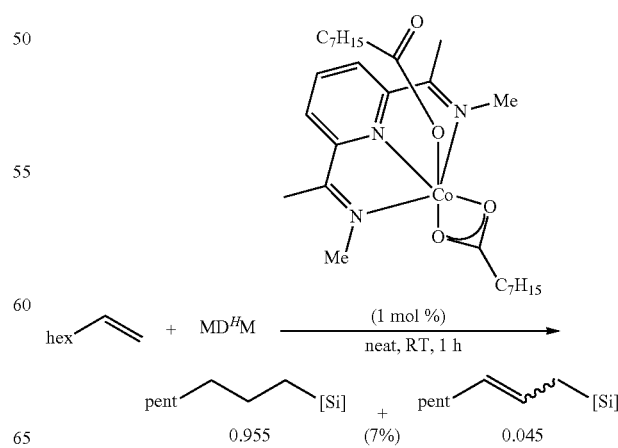

Example 11. Procedure for Hydrosilylation of 1-octene with Triethoxysilane and ($^{TF}$APDI)Co(2-ethylhexanoate)$_2$ To a scintillation vial equipped with a stir bar in a nitrogen filled glovebox was added ($^{TF}$APDI)Co(2-ethylhexanoate)$_2$ (5 mg, 0.009 mmol) followed by 1-octene (125 mg, 1.11 mmol) to give a heterogeneous mixture. Triethoxysilane (183 mg, 1.11 mmol) was then added resulting in formation of an olive green reaction mixture. The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (303 mg, 98%). The product distribution was determined by analysis of the $^1$H NMR spectrum of the isolated product.

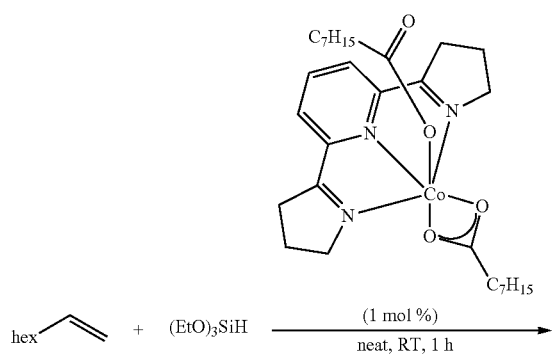

Example 12. Procedure for Hydrosilylation of 1-octene with MD$^H$M and ($^{TF}$APDI)Co(2-ethylhexanoate)$_2$ To a scintillation vial equipped with a stir bar in a nitrogen filled glovebox was added ($^{TF}$APDI)Co(2-ethylhexanoate)$_2$ (5 mg, 0.009 mmol) followed by 1-octene (100 mg, 0.891 mmol) to give a heterogeneous mixture. MD$^H$M (198 mg, 0.891 mmol) was then added and the vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (273 mg, 92%). The product distribution was determined by analysis of the $^1$H NMR spectrum of the isolated product and comparison to authentic material.

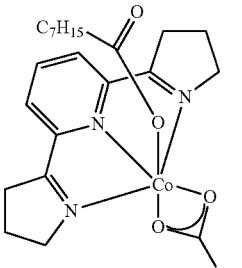
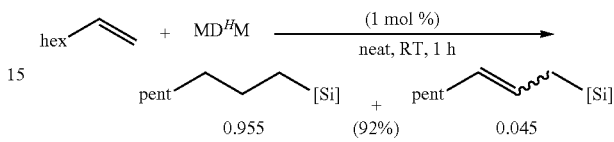

Example 13. Procedure for Hydrosilylation of 1-octene with Reduced Catalyst Loading Utilizing Triethoxysilane and ($^{Me}$APDI)Co(2-ethylhexanoate)$_2$ To a scintillation vial equipped with a stir bar in a nitrogen filled glovebox was added a toluene solution of ($^{Me}$APDI)Co(2-ethylhexanoate)$_2$ (0.25 mL, 0.0090M) and the solvent was removed under reduced pressure. 1-octene (100 mg, 0.891 mmol) was then added followed by triethoxysilane (146 mg, 0.891 mmol). The vial was sealed with a cap, removed from the glove box and stirred at room temperature for 3 hours. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (204 mg, 83%). The product distribution was determined by analysis of the $^1$H NMR spectrum of the isolated product and comparison to authentic material.

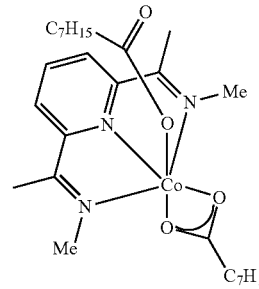
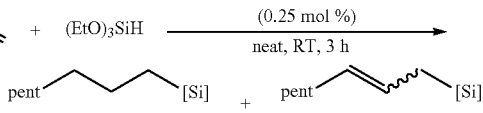

Example 14. Procedure for Hydrosilylation of 1-octene with Reduced Catalyst Loading Utilizing Triethoxysilane and ($^{TF}$APDI)Co(2-ethylhexanoate)$_2$ To a scintillation vial equipped with a stir bar in a nitrogen filled glovebox was added a toluene solution of ($^{TF}$APDI)

Co(2-ethylhexanoate)₂ (0.12 mL, 0.0072M) and the solvent was removed under reduced pressure. 1-Octene (100 mg, 0.891 mmol) was then added followed by triethoxysilane (146 mg, 0.891 mmol). The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (245 mg, 99%). The product distribution was determined by analysis of the ¹H NMR spectrum of the isolated product and comparison to authentic material.

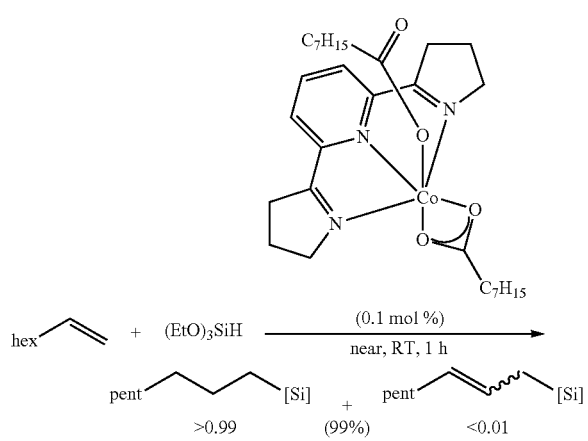

Example 15. Preparation of (^{Mes}PDI)Co(2-ethylhexanoate)₂

To a 100 mL round-bottomed flask equipped with stir bar on the benchtop was added ^{Mes}PDI (1.00 g, 2.52 mmol) followed by toluene (30 mL) to give a clear, yellow solution. Cobalt(II) 2-ethylhexanoate (as a 65 wt % solution in mineral spirits from Aldrich, 1.33 mL, 2.52 mmol) was added in one portion via syringe to give a dark brown-orange reaction mixture. After stirring at room temperature for 1.5 hours, the flask was equipped with a vacuum adapter and the solvent and mineral spirits were removed under reduced pressure. The resulting dark orange solid material was ground to a powder and further dried under high vacuum overnight to give the product as an orange powder (1.70 g, 91%).

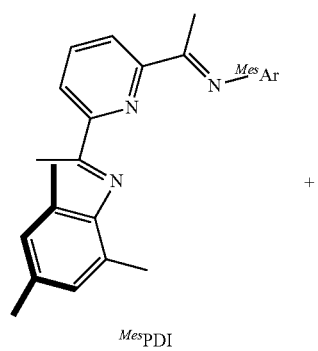

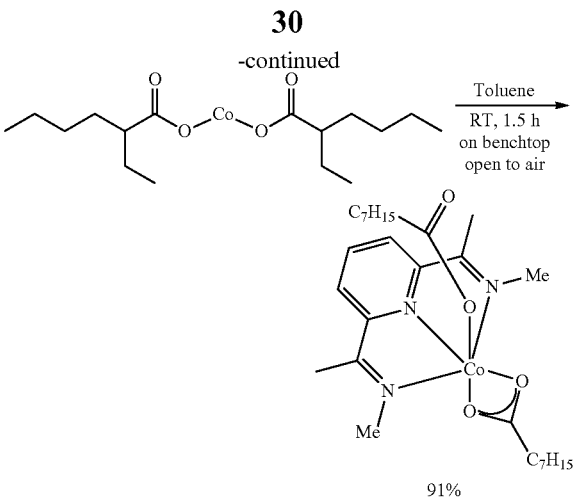

Example 16. Procedure for Dehydrogenative Hydrosilylation of 1-octene with Triethoxysilane (2:1 Stoichiometry) and (^{Mes}PDI)Co(2-ethylhexanoate)₂

To a scintillation vial equipped with a stir bar in a nitrogen filled glovebox was added (^{Mes}PDI)Co(2-ethylhexanoate)₂ (7 mg, 0.009 mmol) followed by 1-octene (200 mg, 1.78 mmol) to give a heterogeneous mixture. Triethoxysilane (146 mg, 0.891 mmol) was then added resulting in the formation of an olive green reaction mixture after 1-2 minutes at room temperature. The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, slightly yellow eluent was concentrated to give the product as a clear, slightly yellow oil (213 mg, 87%). The product distribution was determined by analysis of the ¹H NMR spectrum of the isolated product.

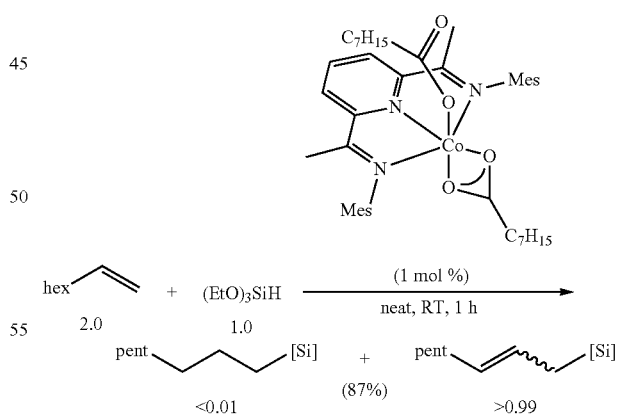

Example 17. Procedure for Dehydrogenative Hydrosilylation of 1-octene with Triethoxysilane (1:1 Stoichiometry) and (^{Mes}PDI)Co(2-ethylhexanoate)₂

To a scintillation vial equipped with a stir bar in a nitrogen filled glovebox was added (^{Mes}PDI)Co(2-ethylhexanoate)₂

(7 mg, 0.009 mmol) followed by 1-octene (100 mg, 0.891 mmol) to give a heterogeneous mixture. Triethoxysilane (146 mg, 0.891 mmol) was then added resulting in the formation of an olive green reaction mixture after 1-2 minutes at room temperature. The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, slightly yellow eluent was concentrated to give the product as a clear, slightly yellow oil (126 mg, 52%). The product distribution was determined by analysis of the $^1$H NMR spectrum of the isolated product.

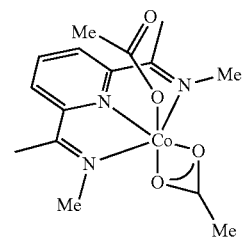

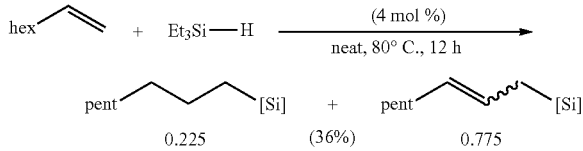

Example 19. Hydrosilylation of Acetoxy-capped Polyether (Y10227) with MD$^H$M and ($^{Me}$APDI)Co (2-ethylhexanoate)$_2$ To a scintillation vial equipped with a stir bar in a nitrogen filled glovebox was added ($^{Me}$APDI)Co(2-ethylhexanoate)$_2$ (0.002 g, 0.004 mmol) followed by Y10227 (239 mg, 0.400 mmol) and MD$^H$M (89 mg, 0.40 mmol). The vial was sealed with a cap, removed from the box and stirred at room temperature for 3 hours. The cap was removed and any remaining volatiles were removed with a stream of air. The resulting material was analyzed by NMR for conversion and product distribution.

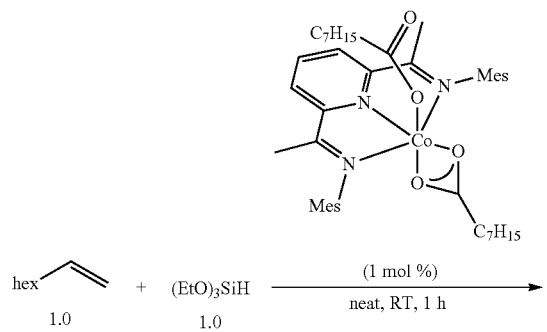

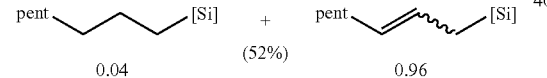

Example 18. Procedure for Hydrosilylation of 1-octene with Triethylsilane and ($^{Me}$APDI)Co (OAc)$_2$ To a scintillation vial equipped with a stir bar in a nitrogen filled glovebox was added ($^{Me}$APDI)Co(OAc)$_2$ (10 mg, 0.027 mmol) followed by 1-octene (75 mg, 0.67 mmol) to give a heterogeneous mixture. Triethylsilane (78 mg, 0.67 mmol) was then added and the vial was sealed with a cap, removed from the box and heated to 80° C. in an oil bath with stirring for 12 hours. After cooling to room temperature, the cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (55 mg, 36%). The product distribution was determined by analysis of the $^1$H NMR spectrum of the isolated product.

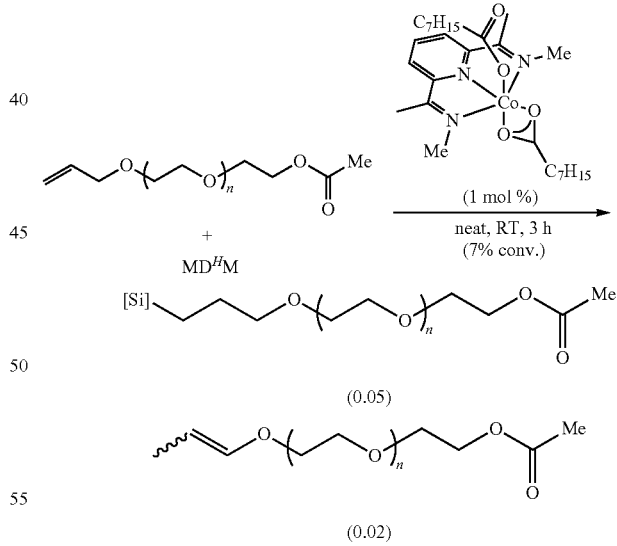

Example 20. Hydrosilylation of Acetoxy-capped Polyether (Y10227) with MD$^H$M and ($^{TF}$APDI)Co (2-ethylhexanoate)$_2$ To a scintillation vial equipped with a stir bar in a nitrogen filled glovebox was added ($^{TF}$APDI)Co(2-ethylhexanoate)$_2$ (0.002 g, 0.004 mmol) followed by Y10227 (239 mg, 0.400 mmol) and MD$^H$M (89 mg, 0.40 mmol). The vial was sealed with a cap, removed from the box and heated to 60° C. in an oil bath with stirring for 3 hours. After cooling to room temperature, the cap was removed and any remaining volatiles were removed with a stream of air. The resulting material was analyzed by NMR for conversion and product distribution.

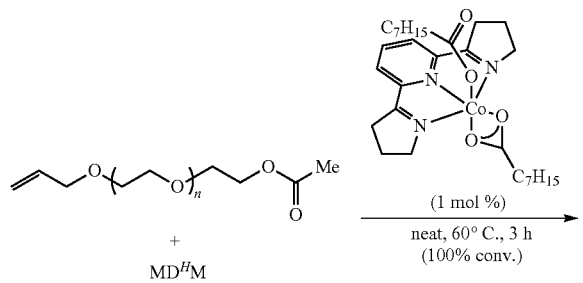

Example 21. Procedure for Hydrosilylation of Allyl Glycidyl Ether with Triethoxysilane and ($^{Me}$APDI) Co(2-ethylhexanoate)$_2$ To a scintillation vial equipped with a stir bar in a nitrogen filled glovebox was added ($^{Me}$APDI)Co(2-ethylhexanoate)$_2$ (5 mg, 0.009 mmol) followed by triethoxysilane (146 mg, 0.891 mmol) to give a dark green mixture. The vial was sealed with a septum, removed from the box and allyl glycidyl ether (0.11 mL, 0.89 mmol) was added to the reaction via syringe through the septum. After stirring at room temperature for 1 hour, the septum was removed and any remaining volatiles were removed with a stream of air. The resulting residue was diluted with a solution of 10% ethyl ether in pentane and passed through a small column of silica gel, eluting with additional 10% ether in pentane solution (5 mL). The resulting clear, colorless eluent was concentrated to give the product as a clear, colorless oil (217 mg, 87%). The product distribution was determined by analysis of the $^1$H NMR spectrum of the isolated product.

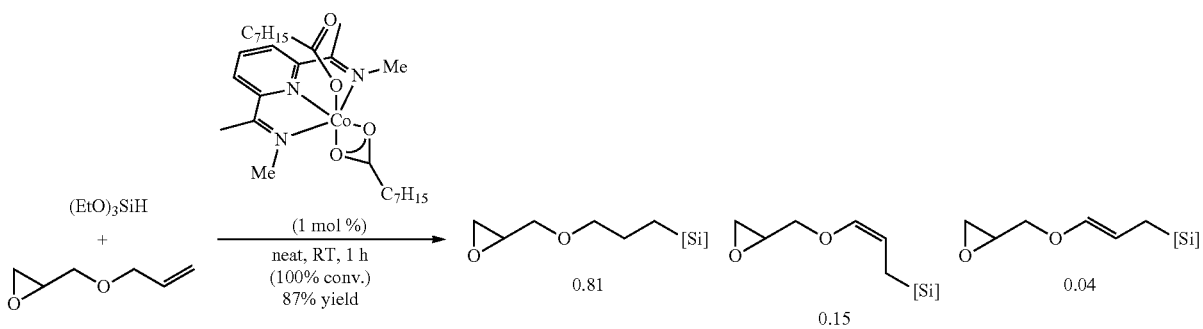

Example 22. Procedure for Hydrosilylation of Allyl Glycidyl Ether with Triethoxysilane and ($^{TF}$APDI) Co(2-ethylhexanoate)$_2$ -continued

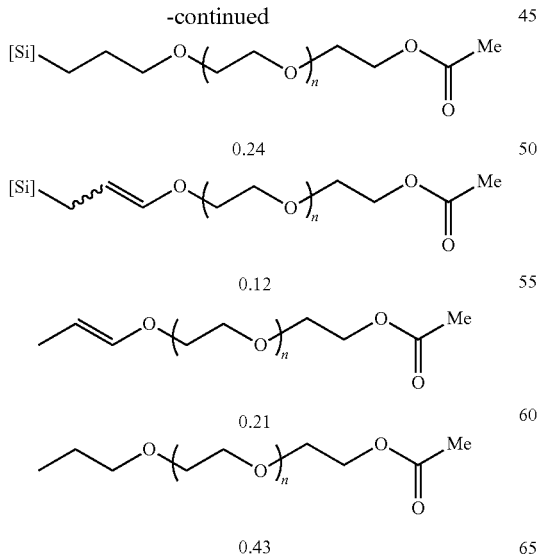

To a scintillation vial equipped with a stir bar in a nitrogen filled glovebox was added ($^{TF}$APDI)Co(2-ethylhexanoate)$_2$ (2 mg, 0.004 mmol) followed by triethoxysilane (146 mg, 0.891 mmol) to give a dark green mixture. The vial was sealed with a septum, removed from the box and cooled to 0° C. in an ice water bath. Allyl glycidyl ether (0.11 mL, 0.89 mmol) was added to the reaction via syringe through the septum and the reaction was stirred at 0° C. for 5 minutes, then removed from the ice bath and stirred at room temperature for 1 hour. The septum was then removed and any remaining volatiles were removed with a stream of air. The resulting residue was diluted with a solution of 10% ethyl ether in pentane and passed through a small column of silica gel, eluting with additional 10% ether in pentane solution (5 mL). The resulting clear, colorless eluent was concentrated to give the product as a clear, colorless oil (234 mg, 94%). The product distribution was determined by analysis of the $^1$H NMR spectrum of the isolated product.

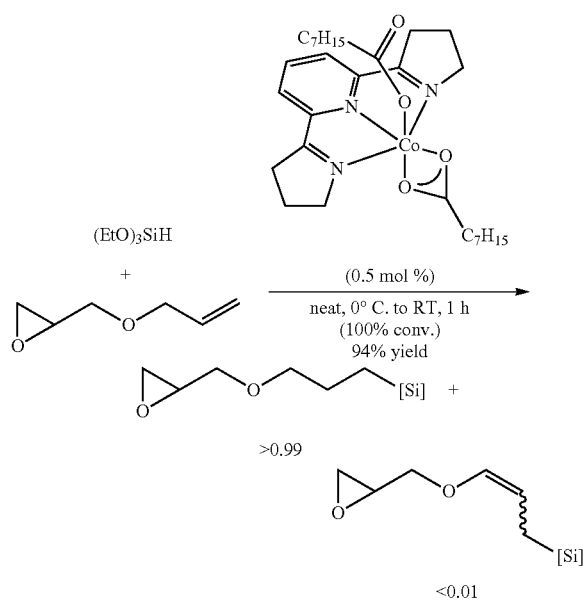

Example 23. Procedure for Hydrosilylation of Allyl Glycidyl Ether with MD$^H$M and ($^{TF}$APDI)Co(2-ethylhexanoate)$_2$ To a scintillation vial equipped with a stir bar in a nitrogen filled glovebox was added ($^{TF}$APDI)Co(2-ethylhexanoate)$_2$ (5 mg, 0.009 mmol) followed by MD$^H$M (198 mg, 0.891 mmol) to give a brown-green mixture. The vial was sealed with a septum, removed from the box and allyl glycidyl ether (0.11 mL, 0.89 mmol) was added to the reaction via syringe through the septum and the reaction was stirred at room temperature for 1 hour. The septum was then removed and any remaining volatiles were removed with a stream of air. The resulting residue was diluted with a solution of 10% ethyl ether in pentane and passed through a small column of silica gel, eluting with additional 10% ether in pentane solution (5 mL). The resulting clear, colorless eluent was concentrated to give the product as a clear, colorless oil (289 mg, 96%). The product distribution was determined by analysis of the $^1$H NMR spectrum of the isolated product.

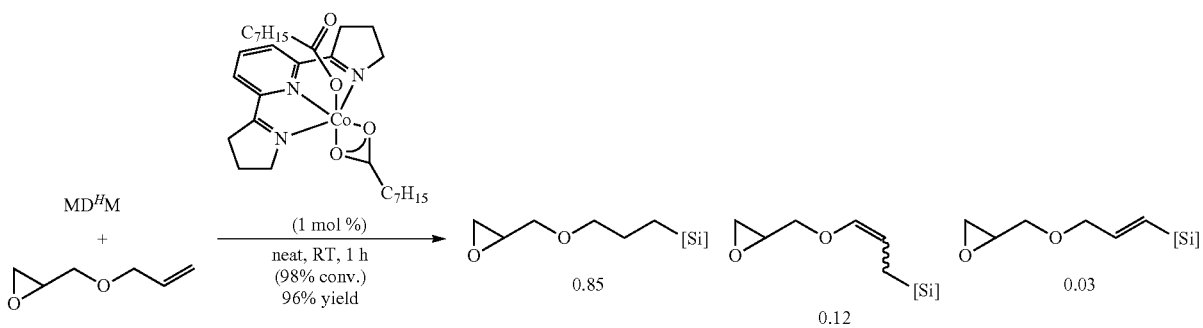

Example 24. Procedure for Hydrosilylation of Allyl Glycidyl Ether with Reduced Catalyst Loading Utilizing Triethoxysilane and ($^{TF}$APDI)Co(2-ethylhexanoate)$_2$ To a scintillation vial equipped with a stir bar in a nitrogen filled glovebox was added allyl glycidyl ether (102 mg, 0.891 mmol) followed by a toluene solution of ($^{TF}$APDI)Co(2-ethylhexanoate)$_2$ (100 µL, 0.0089 M) to give a light brown solution. Triethoxysilane (146 mg, 0.891 mmol) was then added, resulting in a light olive-green solution and the vial was sealed with a cap, removed from the glovebox and stirred at room temperature for 3 hours. The cap was then removed and any remaining volatiles were removed with a stream of air. The resulting residue was diluted with a solution of 10% ethyl ether in pentane and passed through a small column of silica gel, eluting with additional 10% ether in pentane solution (5 mL). The resulting clear, colorless eluent was concentrated to give the product as a clear, colorless oil (213 mg, 86%). The product distribution was determined by analysis of the $^1$H NMR spectrum of the isolated product.

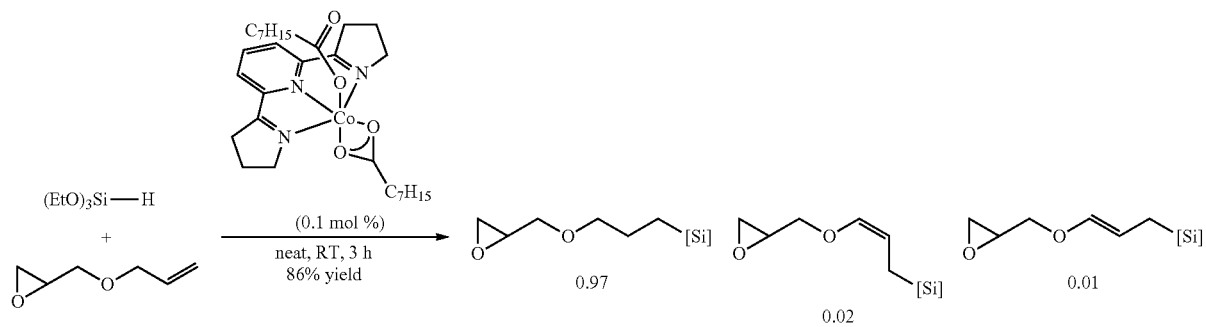

Example 25. Procedure for 10 Gram Total Reactant Scale Hydrosilylation of 1-octene with Reduced Catalyst Loading Utilizing Triethoxysilane and ($^{Me}$APDI)Co(2-ethylhexanoate)$_2$ (Regular Mode)

To a scintillation vial in a nitrogen filled glovebox was added ($^{Me}$APDI)Co(2-ethylhexanoate)$_2$ (19 mg, 0.036 mmol) followed by mesitylene as an internal standard (139 mg, 1.16 mmol) and 1-octene (4.06 g, 36.2 mmol) to give a brown mixture. To a separate scintillation vial in the box was added triethoxysilane (5.94 g, 36.2 mmol). Both vials were sealed with septa, removed from the box and placed under argon. The mixture of catalyst and olefin was then transferred via syringe to an argon filled 50 mL three neck round-bottomed flask equipped with stir bar, reflux condenser, temperature probe and septum. Triethoxysilane was then taken up in a syringe and added to the stirring catalyst/olefin mixture at room temperature over a period of 40 minutes. After stirring at room temperature for 60 minutes, the reaction was warmed to 40° C. and stirred for a total of 8 hours. The reaction was monitored by taking aliquots which were analyzed by both $^1$H NMR and GC. The product distribution was determined by $^1$H NMR analysis.

Example 26. Procedure for 10 Gram Total Reactant Scale Hydrosilylation of 1-octene with Reduced Catalyst Loading Utilizing Triethoxysilane and ($^{Me}$APDI)Co(2-ethylhexanoate)$_2$ (Inverse Mode)

To a scintillation vial in a nitrogen filled glovebox was added ($^{Me}$APDI)Co(2-ethylhexanoate)$_2$ (19 mg, 0.036 mmol) followed by mesitylene as an internal standard (138 mg, 1.15 mmol) and triethoxysilane (5.94 g, 36.2 mmol) to give a dark green mixture. To a separate scintillation vial in the box was added 1-octene (4.06 g, 36.2 mmol). Both vials were sealed with septa, removed from the box and placed under argon. The mixture of catalyst and silane was then transferred via syringe to an argon filled 50 mL three neck round-bottomed flask equipped with stir bar, reflux condenser, temperature probe and septum. 1-Octene was then taken up in a syringe and added to the stirring catalyst/silane mixture at room temperature over a period of 7 minutes. After stirring at room temperature for 30 minutes, the reaction was warmed to 40° C. resulting in a mild exotherm to 57° C. before returning to 40° C. The reaction was monitored by taking aliquots which were analyzed by both $^1$H NMR and GC. The product distribution was determined by $^1$H NMR analysis.

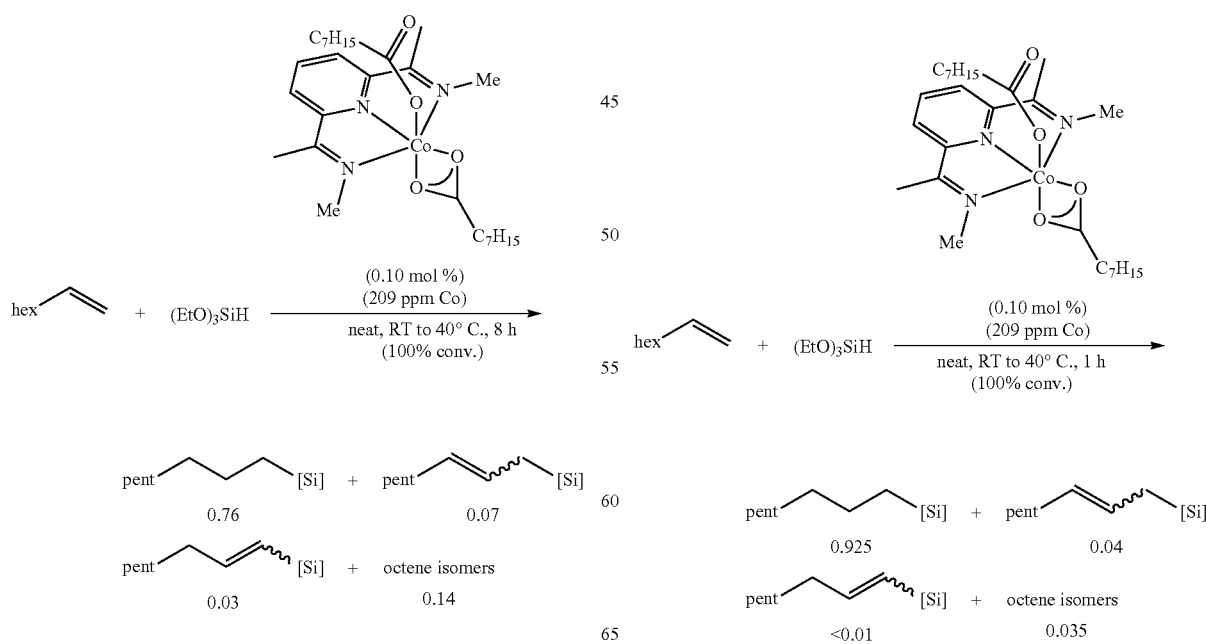

Example 27. Procedure for 10 Gram Total Reactant Scale Hydrosilylation of 1-octene with Reduced Catalyst Loading Utilizing Triethoxysilane and ($^{TF}$APDI)Co(2-ethylhexanoate)$_2$ (Regular Mode)

To a scintillation vial in a nitrogen filled glovebox was added ($^{TF}$APDI)Co(2-ethylhexanoate)$_2$ (5 mg, 0.009 mmol) followed by mesitylene as an internal standard (203 mg, 1.69 mmol) and 1-octene (4.06 g, 36.2 mmol) to give a brown mixture. To a separate scintillation vial in the box was added triethoxysilane (5.94 g, 36.2 mmol). Both vials were sealed with septa, removed from the box and placed under argon. The mixture of catalyst and olefin was then transferred via syringe to an argon filled 50 mL three neck round-bottomed flask equipped with stir bar, reflux condenser, temperature probe and septum. Triethoxysilane was then taken up in a syringe and added to the stirring catalyst/olefin mixture at 35° C. over a period of 12 minutes. After stirring at 35° C. for 10 minutes, the reaction was warmed to 65° C. and stirred for a total of 130 minutes. The reaction was monitored by taking aliquots which were analyzed by both $^1$H NMR and GC. The product distribution was determined by $^1$H NMR analysis.

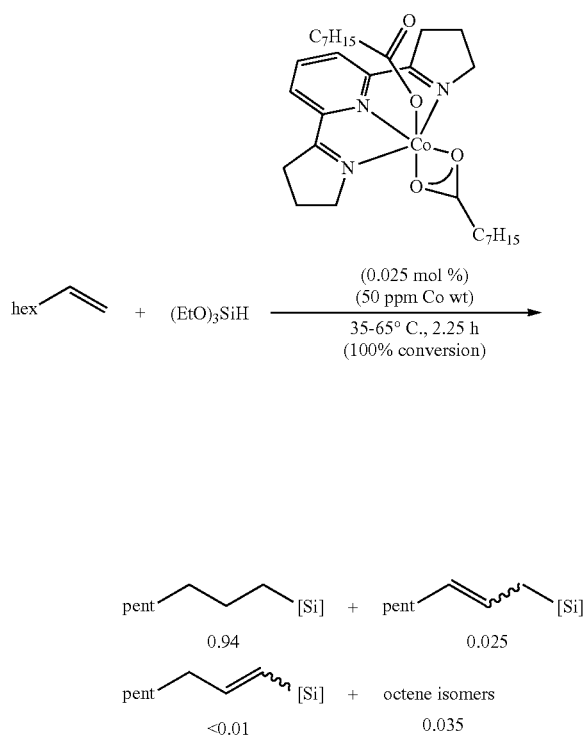

Example 28. Procedure for 10 Gram Total Reactant Scale Hydrosilylation of 1-octene with Reduced Catalyst Loading Utilizing Triethoxysilane and ($^{TF}$APDI)Co(2-ethylhexanoate)$_2$ (Inverse Mode)

To a scintillation vial in a nitrogen filled glovebox was added ($^{TF}$APDI)Co(2-ethylhexanoate)$_2$ (5 mg, 0.009 mmol) followed by mesitylene as an internal standard (208 mg, 1.73 mmol) and triethoxysilane (5.94 g, 36.2 mmol) to give a dark green mixture. To a separate scintillation vial in the box was added 1-octene (4.06 g, 36.2 mmol). Both vials were sealed with septa, removed from the box and placed under argon. The mixture of catalyst and silane was then transferred via syringe to an argon filled 50 mL three neck round-bottomed flask equipped with stir bar, reflux condenser, temperature probe and septum. 1-Octene was then taken up in a syringe and added to the stirring catalyst/silane mixture at room temperature over a period of 21 minutes. During the course of addition, the reaction gently exothermed to 30° C., and after maintaining this temperature for 20 minutes after full addition, the reaction was warmed and maintained between 40 and 45° C. for an additional 40 minutes. The reaction was monitored by taking aliquots which were analyzed by both $^1$H NMR and GC. The product distribution was determined by $^1$H NMR analysis.

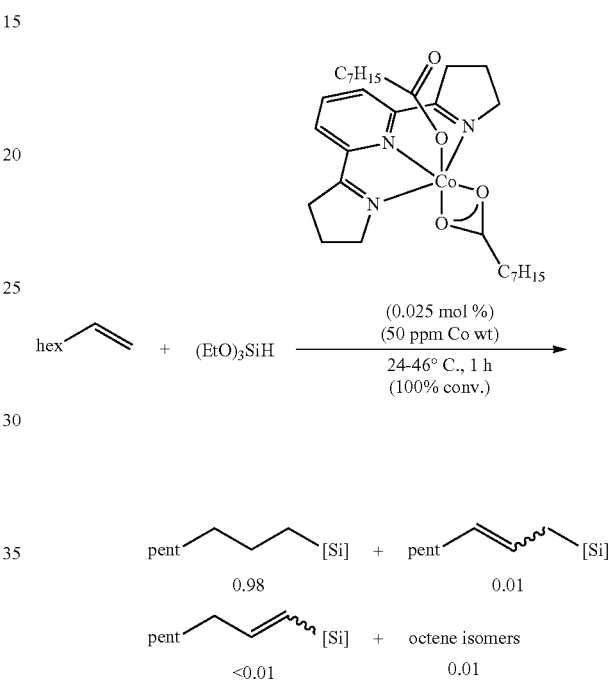

Example 29. Procedure for 10 Gram Total Reactant Scale Hydrosilylation of Allyl Glycidyl Ether with Reduced Catalyst Loading Utilizing Triethoxysilane and ($^{TF}$APDI)Co(2-ethylhexanoate)$_2$ (Inverse Mode)

To a scintillation vial in a nitrogen filled glovebox was added ($^{TF}$APDI)Co(2-ethylhexanoate)$_2$ (5 mg, 0.009 mmol) followed by mesitylene as an internal standard (203 mg, 1.69 mmol) and triethoxysilane (5.90 g, 35.9 mmol) to give a dark green mixture. To a separate scintillation vial in the box was added allyl glycidyl ether (4.10 g, 35.9 mmol). Both vials were sealed with septa, removed from the box and placed under argon. The mixture of catalyst and silane was then transferred via syringe to an argon filled 50 mL three neck round-bottomed flask equipped with stir bar, reflux condenser, temperature probe and septum. Allyl glycidyl ether was then taken up in a syringe and added to the stirring catalyst/silane mixture at 30° C. over a period of 19 minutes. During the course of addition, the reaction gently exothermed to 40° C., and was maintained between 40 and 45° C. for an additional 20 minutes after full addition. The reaction was monitored by taking aliquots which were analyzed by both $^1$H NMR and GC. The product distribution was determined by $^1$H NMR analysis.

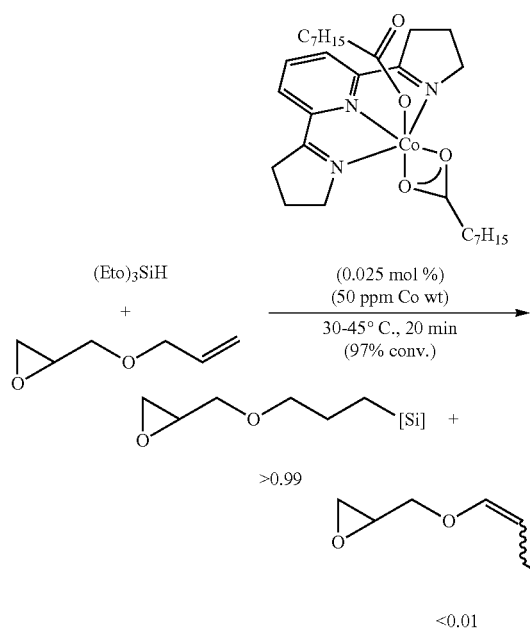

Comparative Example 30. Attempted Hydrosilylation of 1-octene with Triethoxysilane and ($^{Me}$APDI)CoCl$_2$ To a scintillation vial equipped with a stir bar in a nitrogen filled glovebox was added ($^{Me}$APDI)CoCl$_2$ (2 mg, 0.008 mmol) followed by triethoxysilane (123 mg, 0.750 mmol) to give a heterogeneous mixture. 1-Octene (168 mg, 1.50 mmol) was then added and the vial was sealed with a cap, removed from the box and heated to 80° C. in an oil bath with stirring for 42 hours. After cooling to room temperature, the cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give a light residue which contained no identifiable hydrosilylation products by $^1$H NMR.

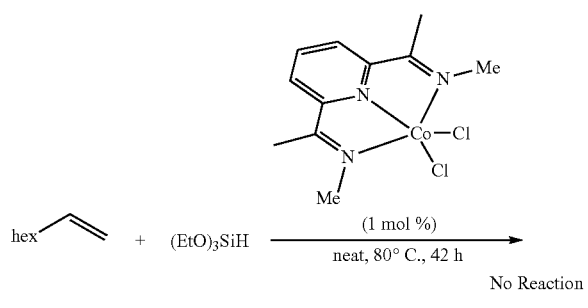

Example 31. Formation of an Active Catalyst from Co(2-ethylhexanoate)$_2$

To a scintillation vial equipped with stir bar in a nitrogen filled glovebox was added 1-octene (200 mg, 1.78 mmol) followed by triethoxysilane (292 mg, 1.78 mmol). The vial was sealed with a septum, removed from the box and Co(2-ethylhexanoate)$_2$ (as a 65 wt % solution in mineral spirits from Aldrich, 10 µL, 0.018 mmol) was added through the septum via syringe. The resulting light blue solution was stirred at room temperature for 1.5 hours, after which the cap was removed and a small aliquot was taken for $^1$H NMR and GC analysis followed by the removal of any remaining volatiles with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give a clear, colorless oil (102 mg). The product distribution was determined by $^1$H NMR analysis.

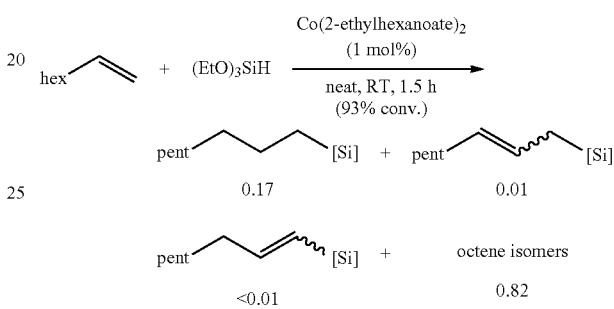

Example 32. Formation of an Active Catalyst from Co(2-ethylhexanoate)$_2$ at Elevated Temperature To a scintillation vial equipped with stir bar in a nitrogen filled glovebox was added 1-octene (200 mg, 1.78 mmol) followed by triethoxysilane (292 mg, 1.78 mmol). The vial was sealed with a septum, removed from the box and Co(2-ethylhexanoate)$_2$ (as a 65 wt % solution in mineral spirits from Aldrich, 10 µL, 0.018 mmol) was added through the septum via syringe. The resulting light blue solution was stirred at 80° C. in an oil bath for 1.5 hours then cooled to room temperature. The cap was removed and a small aliquot was taken for $^1$H NMR and GC analysis followed by the removal of any remaining volatiles with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give a clear, colorless oil (235 mg). The product distribution was determined by $^1$H NMR analysis.

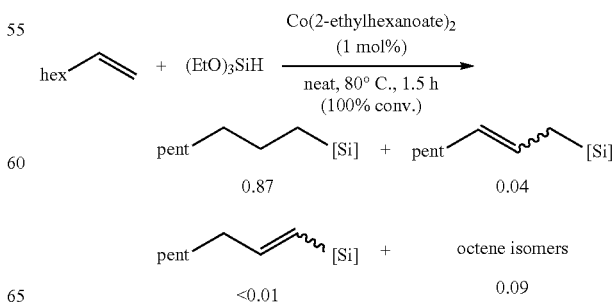

Example 33. Formation of an Active Catalyst from Co(2-ethylhexanoate)₂

To a scintillation vial equipped with stir bar in a nitrogen filled glovebox was added allyl glycidyl ether (203 mg, 1.78 mmol) followed by triethoxysilane (292 mg, 1.78 mmol). The vial was sealed with a septum, removed from the box and Co(2-ethylhexanoate)₂ (as a 65 wt % solution in mineral spirits from Aldrich, 10 µL, 0.018 mmol) was added through the septum via syringe. The resulting light blue solution was stirred at room temperature for 1.5 hours, after which the cap was removed and a small aliquot was taken for ¹H NMR and GC analysis followed by the removal of any remaining volatiles with a stream of air. The resulting residue was diluted with a solution of 10% ethyl ether in pentane and passed through a small column of silica gel, eluting with additional 10% ether in pentane solution (5 mL). The resulting clear, colorless eluent was concentrated to give a clear, colorless oil (326 mg). The product distribution was determined by ¹H NMR analysis.

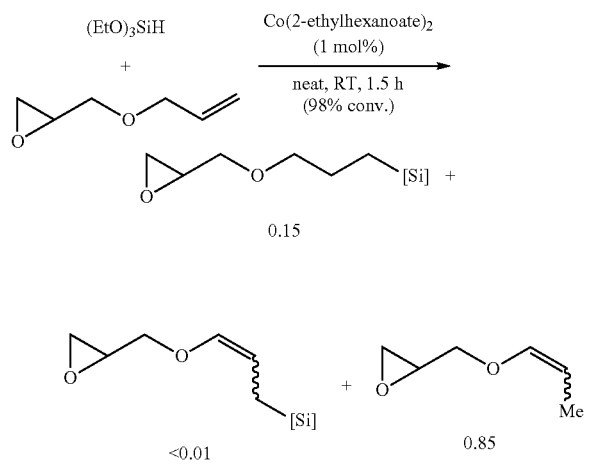

Example 34. Formation of an Active Catalyst from Co(2-ethylhexanoate)₂ at Elevated Temperature To a scintillation vial equipped with stir bar in a nitrogen filled glovebox was added allyl glycidyl ether (203 mg, 1.78 mmol) followed by triethoxysilane (292 mg, 1.78 mmol). The vial was sealed with a septum, removed from the box and Co(2-ethylhexanoate)₂ (as a 65 wt % solution in mineral spirits from Aldrich, 10 µL, 0.018 mmol) was added through the septum via syringe. The resulting light blue solution was stirred at 80° C. in an oil bath for 1.5 hours then cooled to room temperature. The cap was removed and a small aliquot was taken for ¹H NMR and GC analysis followed by the removal of any remaining volatiles with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give a clear, colorless oil (235 mg). The product distribution was determined by ¹H NMR analysis.

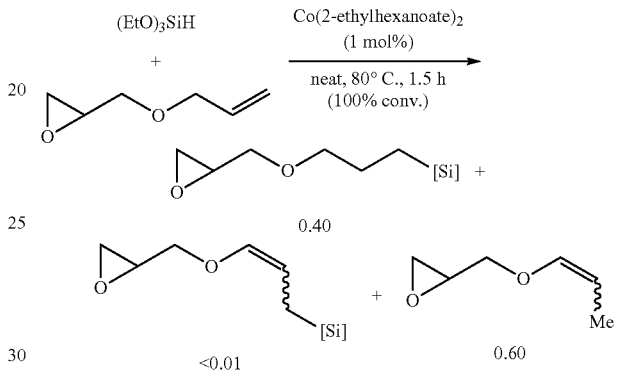

Example 35. Cross-Linking of SL6100 and SL6020 D1 with (ᴹᵉAPDI)Co(2-ethylhexanoate)₂ at Elevated Temperature To a scintillation vial in a nitrogen filled glovebox was added olefin fluid SL6100 (1.00 g) followed by SL6020 (0.044 g) (1:2 molar ratio). The fluids were thoroughly mixed to give a clear, colorless solution. (ᴹᵉAPDI)Co(2-ethylhexanoate)₂ was then added as a solution in toluene (20 µL, 0.090M) [11 ppm wt Co] which immediately dispersed into the fluid mixture. The vial was sealed with a cap, removed from the box and heated to 80° C. in an oil bath. After 24 hours, gel formation occurred and the cap was removed to examine the crosslinked product. A relatively soft gel was observed.

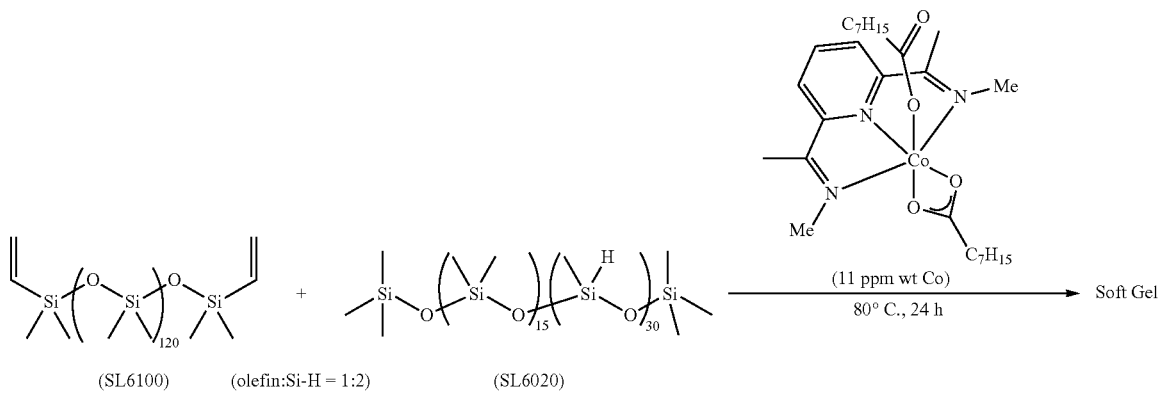

Example 36. Cross-Linking of SL6100 and SL6020 with ($^{TF}$APDI)Co(2-ethylhexanoate)$_2$ at Room Temperature To a scintillation vial in a nitrogen filled glovebox was added olefin fluid SL6100 (2.00 g) followed by SL6020 (0.088 g) (1:2 molar ratio). The fluids were thoroughly mixed to give a clear, colorless solution. ($^{TF}$APDI)Co(2-ethylhexanoate)$_2$ was then added as a solution in toluene (21 μL, 0.0036M) [2 ppm wt Co] which immediately dispersed into the fluid mixture. The vial was sealed with a cap, removed from the box and allowed to stand at room temperature with occasional agitation. After 68 minutes, gel formation occurred and the reaction was allowed to stand at room temperature for an additional 12 hours. A relatively hard gel was observed.

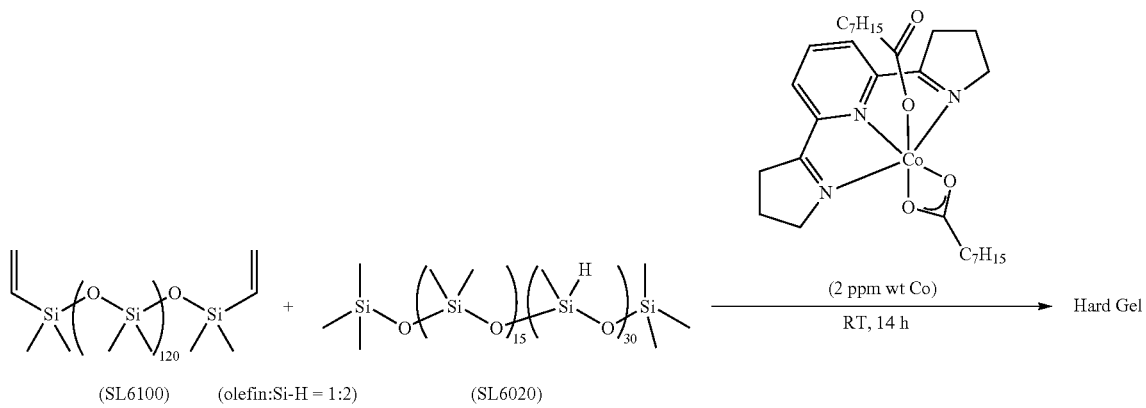

Example 37. Cross-Linking of SL6100 and SL6020 with ($^{TF}$APDI)Co(2-ethylhexanoate)$_2$ at Elevated Temperature To a scintillation vial in a nitrogen filled glovebox was added olefin fluid SL6100 (1.00 g) followed by SL6020 (0.044 g) (1:2 molar ratio). The fluids were thoroughly mixed to give a clear, colorless solution. ($^{TF}$APDI)Co(2-ethylhexanoate)$_2$ was then added as a solution in toluene (40 μL, 0.00048M) [1 ppm wt Co] which immediately dispersed into the fluid mixture. The vial was sealed with a cap, removed from the box and heated to 80° C. in an oil bath. After 5 minutes, gel formation occurred and the reaction was heated at 80° C. for an additional 12 hours. A relatively soft gel was observed.

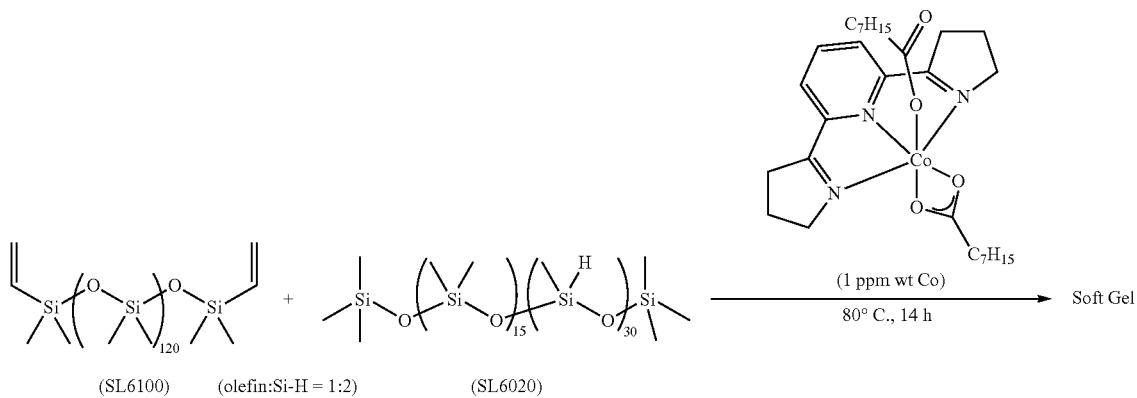

Example 38. Preparation of (PyBox)Co(2-ethylhexanoate)$_2$

To a 50 mL round-bottomed flask equipped with a stir bar on the benchtop was added PyBox (200 mg, 0.921 mmol) (prepared according to the literature procedure: Zhu, Y-Y.; Cui, C.; Li, N.; Wang, B-W.; Wang, Z-M.; Gao, S. *Eur. J. Inorg. Chem.* 2013, 3101) followed by toluene (15 mL) and a small amount of dichloromethane (3 mL) to give a clear, slightly yellow solution. Cobalt(II) 2-ethylhexanoate (as a 65 wt % solution in mineral spirits from Aldrich, 0.490 mL, 0.921 mmol) was then added in one portion via syringe and the resulting dark brown reaction mixture was rapidly stirred at room temperature for 2 hours. The flask was then equipped with a vacuum adapter and the solvent and mineral spirits were removed under reduced pressure. The resulting dark grey-brown solid material was ground to a powder and further dried under high vacuum overnight to give the product as a grey slightly purple powder (431 mg, 83%). $^1$H NMR (300 MHz, CDCl$_3$, 23° C.): δ=89.34 (s, Δυ$_{1/2}$=116 Hz, 1H), 54.39 (s, Δυ$_{1/2}$=43 Hz, 2H), 20.76, 20.52 (overlapping signals, 7H), 10.73 (s, Δυ$_{1/2}$=70 Hz, 2H), 9.05 (s, Δυ$_{1/2}$=78 Hz, 2H), 8.10 (s, Δυ$_2$=64 Hz, 6H), 4.89 (s, Δυ$_{1/2}$=64 Hz, 2H), 4.43 (s, 71 Hz, 2H), 2.81 (s, Δυ$_{1/2}$=39 Hz, 1H), 0.74 (s, Δυ$_2$=35 Hz, 8H), −10.73 (s, Δυ$_{1/2}$=40 Hz, 4H), −30.03 (s, Δυ$_{1/2}$=100 Hz, 4H).

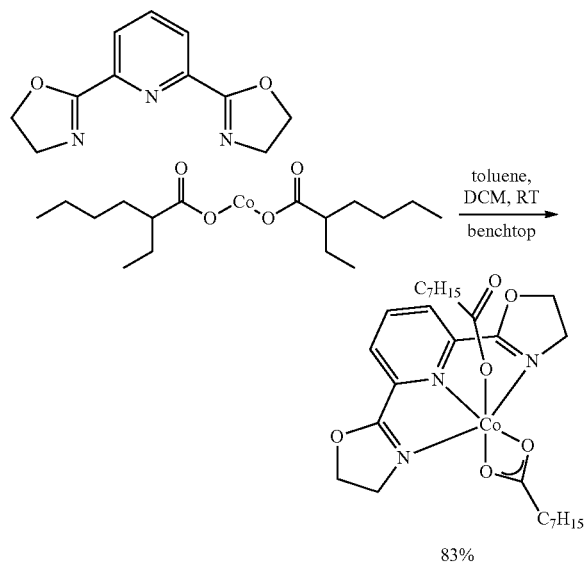

83%

Example 39. Procedure for Hydrosilylation of 1-octene with Triethoxysilane and (PyBox)Co(2-ethylhexanoate)$_2$ To a scintillation vial equipped with a stir bar in a nitrogen filled glovebox was added (PyBox)Co(2-ethylhexanoate)$_2$ (5 mg, 0.009 mmol) followed by 1-octene (100 mg, 0.891 mmol) to give a heterogeneous mixture. Triethoxysilane (146 mg, 0.891 mmol) was then added and the vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (235 mg, 95%). The product distribution was determined by analysis of the $^1$H NMR spectrum of the isolated product.

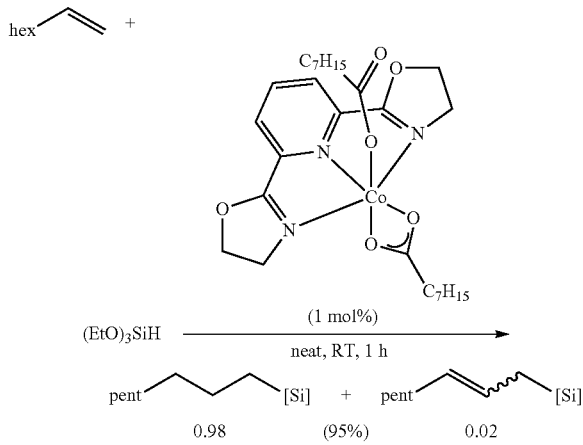

Example 40. Procedure for Hydrosilylation of 1-octene with Reduced Catalyst Loading Utilizing Triethoxysilane and (PyBox)Co(2-ethylhexanoate)$_2$ To a scintillation vial equipped with a stir bar in a nitrogen filled glovebox was added a tetrahydrofuran solution of (PyBox)Co(2-ethylhexanoate)$_2$ (0.25 mL, 0.0036M) and the solvent was removed under reduced pressure. 1-Octene (100 mg, 0.891 mmol) was then added followed by triethoxysilane (146 mg, 0.891 mmol). The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (220 mg, 89%). The product distribution was determined by analysis of the $^1$H NMR spectrum of the isolated product.

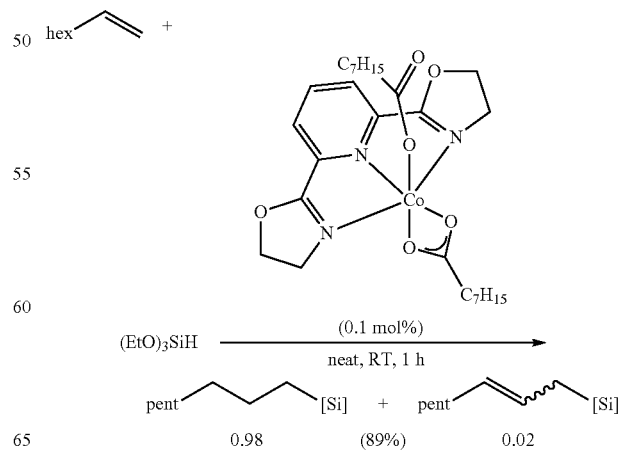

Example 41. Procedure for Hydrosilylation of Allyl Glycidyl Ether with Triethoxysilane and (PyBox)Co(2-ethylhexanoate)$_2$ To a scintillation vial equipped with a stir bar in a nitrogen filled glovebox was added (PyBox)Co(2-ethylhexanoate)$_2$ (5 mg, 0.009 mmol) followed by allyl glycidyl ether (102 mg, 0.891 mmol) to give a heterogeneous mixture. Triethoxysilane (146 mg, 0.891 mmol) was then added and the vial was sealed with a cap, removed from the box and stirred at room temperature for 1 hour. The cap was removed and any remaining volatiles were removed with a stream of air. The resulting residue was diluted with a solution of 10% ethyl ether in pentane and passed through a small column of silica gel, eluting with additional 10% ether in pentane solution (5 mL). The resulting clear, colorless eluent was concentrated to give the product as a clear, colorless oil (168 mg, 68%). The product distribution was determined by analysis of the $^1$H NMR spectrum of the isolated product.

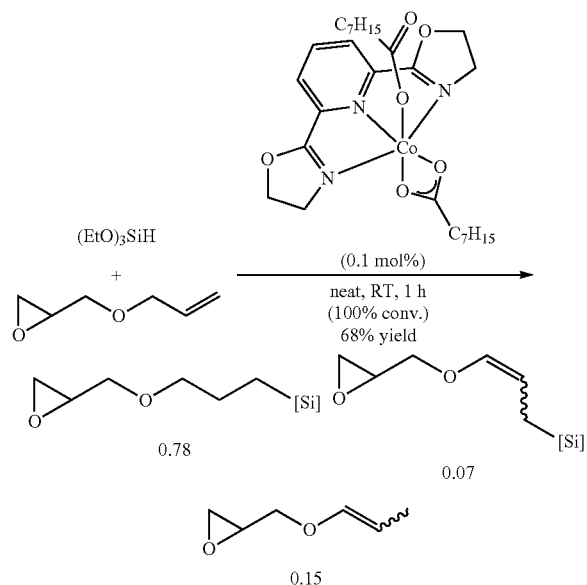

Example 42. Procedure for Hydrosilylation of 1-octene with Triethoxysilane and ($^{Me}$APDI)Co(OPiv)$_2$ To a scintillation vial equipped with a stir bar in a nitrogen filled glovebox was added ($^{Me}$APDI)Co(OPiv)$_2$ (4 mg, 0.009 mmol) followed by 1-octene (100 mg, 0.891 mmol) to give a heterogeneous mixture. Triethoxysilane (146 mg, 0.891 mmol) was then added resulting in formation of an olive green reaction mixture. The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (239 mg, 97%). The product distribution was determined by analysis of the $^1$H NMR spectrum of the isolated product.

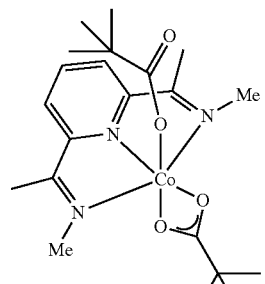

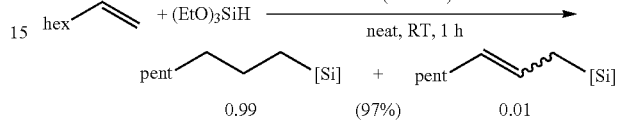

Example 43. Procedure for Hydrosilylation of 1-octene with Triethoxysilane and ($^{TF}$APDI)Co(OPiv)$_2$ To a scintillation vial equipped with a stir bar in a nitrogen filled glovebox was added ($^{TF}$APDI)Co(OPiv)$_2$ (4 mg, 0.009 mmol) followed by 1-octene (100 mg, 0.891 mmol) to give a heterogeneous mixture. Triethoxysilane (146 mg, 0.891 mmol) was then added resulting in formation of an olive green reaction mixture. The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (234 mg, 95%). The product distribution was determined by analysis of the $^1$H NMR spectrum of the isolated product.

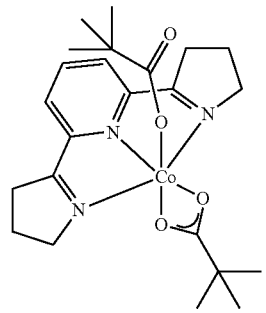

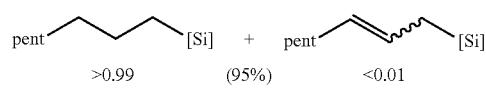

Example 44. Procedure for Hydrosilylation of 1-octene with dimethyl(ethoxy)silane and ($^{TF}$APDI)Co(2-ethylhexanoate)$_2$ To a scintillation vial equipped with a stir bar in a nitrogen filled glovebox was added ($^{TF}$APDI)Co(2-ethylhexanoate)$_2$ (0.019 M solution in toluene, 0.053 mL, 0.001 mmol) followed by 1-octene (112 mg, 1.00 mmol) to give a dark brown solution. Dimethyl(ethoxy)silane (104 mg, 1.00 mmol) was then added resulting in formation of an olive green reaction mixture. The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (195 mg, 90%). The product distribution was determined by analysis of the $^1$H NMR spectrum of the isolated product.

Example 45. Procedure for Hydrosilylation of 1-octene with MM$^H$ and ($^{TF}$APDI)Co(2-ethylhexanoate)$_2$ To a scintillation vial equipped with a stir bar in a nitrogen filled glovebox was added ($^{TF}$APDI)Co(2-ethylhexanoate)$_2$ (6 mg, 0.01 mmol) followed by 1-octene (112 mg, 1.00 mmol) to give a heterogeneous mixture. MM$^H$ (148 mg, 1.00 mmol) was then added resulting in formation of an olive green reaction mixture. The vial was sealed with a cap, removed from the box and stirred at room temperature for 1 hour. The cap was removed and any remaining volatiles were removed with a stream of air. The resulting residue was diluted with a solution of 5% ethyl ether in pentane and passed through a small column of silica gel, eluting with additional 5% ether in pentane solution (5 mL). The resulting clear, colorless eluent was concentrated to give the product as a clear, colorless oil (249 mg, 96%). The product distribution was determined by analysis of the $^1$H NMR spectrum of the isolated product.

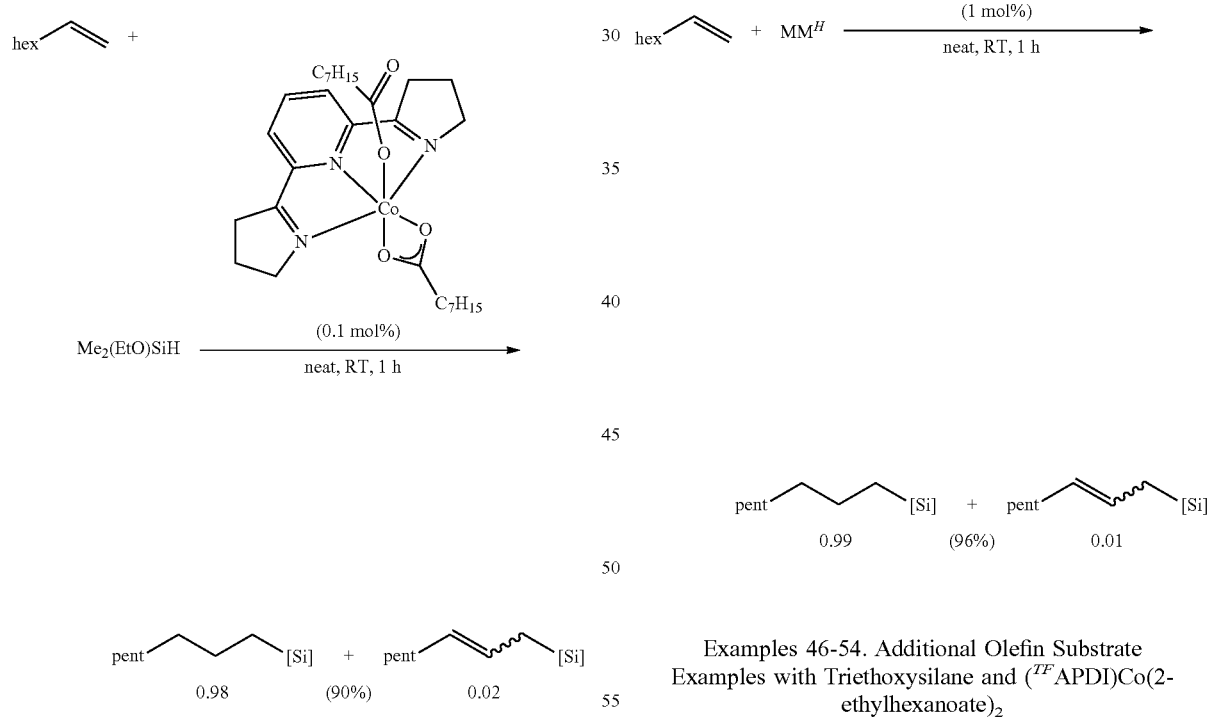

Examples 46-54. Additional Olefin Substrate Examples with Triethoxysilane and ($^{TF}$APDI)Co(2-ethylhexanoate)$_2$ The representative examples shown below were examined under the reaction conditions noted and were run using procedures analogous to those above. The product distribution was determined by analysis of the $^1$H NMR spectra of the isolated products. In all cases, the reaction was greater than 98% selective for hydrosilylation.

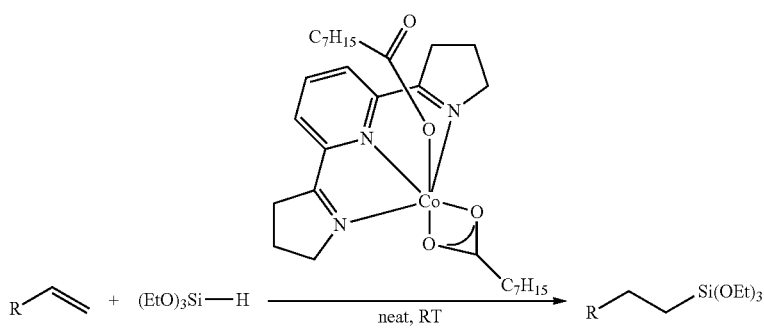

| Entry | Product | Catalyst Loading (mol %) | Time (h) | Isolated Yield (%) |
|---|---|---|---|---|
| 46 | (pyrrolidinone-N-CH2CH2-Si(OEt)3) | 0.25 | 1 | 84 |
| 47 | PhNH-CH2CH2CH2-Si(OEt)3 | 0.25 | 1 | 97 |
| 48 | $Me_2N$-CH2CH2CH2-Si(OEt)3 | 0.5 | 1 | 74 |
| 49 | Ph-CH2CH2-Si(OEt)3 | 0.25 | 1 | 99 |
| 50 | cyclohexenyl-CH2CH2-Si(OEt)3 | 0.25 | 1 | 97 |
| 51 | tBuCH2-CH2CH2-Si(OEt)3 | 0.25 | 24 | 87 |
| 52 | epoxycyclohexyl-CH2CH2-Si(OEt)3 | 0.25 | 1 | 96 |
| 53 | MeC(O)CH2CH2CH2CH2-Si(OEt)3 | 0.25 | 1 | 93 |
| 54 | MeC(O)O-CH2CH2-Si(OEt)3 | 0.25 | 5 | 86 |

While the above description contains many specifics, these specifics should not be construed as limitations on the scope of the invention, but merely as exemplifications of preferred embodiments thereof. Those skilled in the art may envision other possible variations that are within the scope and spirit of the invention as defined by the claims appended hereto.

What is claimed is:

1. A process for producing a silylated product comprises reacting a mixture comprising (a) an unsaturated compound containing at least one unsaturated functional group, (b) a silyl hydride containing at least one silylhydride functional group, and (c) a catalyst, optionally in the presence of a solvent, to produce a dehydrogenative silylated product, a hydrosilylated product, or a combination of a dehydrogenative silylated product and a hydrosilylated product, wherein the catalyst is a complex of the Formula (I) or an adduct thereof; Formula (II), or a combination of two or more thereof:

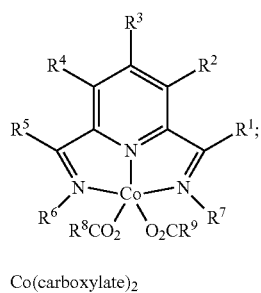
(I)

Co(carboxylate)$_2$ (II)

wherein each occurrence of $R^1$, $R^2$, $R^3$, $R^4$, and $R^5$ is independently chosen from hydrogen, a C1-C18 alkyl, a C1-C18 substituted alkyl, an aryl, a substituted aryl, or an inert substituent, where $R^1$-$R^5$, other than hydrogen, may optionally contain at least one heteroatom;

each occurrence of $R^6$ and $R^7$ is independently chosen from a C1-C18 alkyl, a C1-C18 substituted alkyl, an aryl, or a substituted aryl, where $R^6$ and $R^7$ may optionally contain at least one heteroatom;

optionally any two neighboring groups of $R^1$, $R^2$, $R^3$, $R^4$, $R^5$, $R^6$, and $R^7$ taken together may form a ring being a substituted or unsubstituted, saturated, or unsaturated cyclic structure, optionally containing one or more heteroatoms; and $R^8$ and $R^9$ is each independently, chosen from an alkyl or aryl group optionally containing at least one heteroatom, or $R^8$ and $R^9$ are connected so as to form a dicarboxylate chelating group; and the carboxylate is derived from substituted or unsubstituted, straight-chain, branched or cyclic aliphatic carboxylic acid, dicarboxylic acid, or aromatic carboxylic acid, and which optionally contains one or more heteroatoms chosen from O, N, S, P, Si, F, Cl, Br, I, or a combination of two or more thereof;

wherein the mixture is free of a separate reducing agent and a promoter.

2. The process of claim 1, wherein $R^8$ and $R^9$ are each chosen from a C1-C18 alkyl.

3. The process of claim 1, wherein $R^8$ and $R^9$ are each CH$_3$, 3-heptyl, or C(CH3)$_3$.

4. The process of claim 1, wherein $R^6$ and $R^7$ are independently chosen from a C1-C10 alkyl.

5. The process of claim 1, wherein $R^6$ and $R^7$ are each methyl, ethyl, or cyclohexyl.

6. The process of claim 1, wherein $R^1$-$R^7$ and $R^5$-$R^6$ taken together form a 5-membered heterocyclic ring structure or a 6-membered heterocyclic ring structure with the imine nitrogen.

7. The process of claim 6, wherein the ring structure further comprises one or more heteroatoms other than the imine nitrogen.

8. The process of claim 7, wherein the catalyst comprises a compound chosen from:

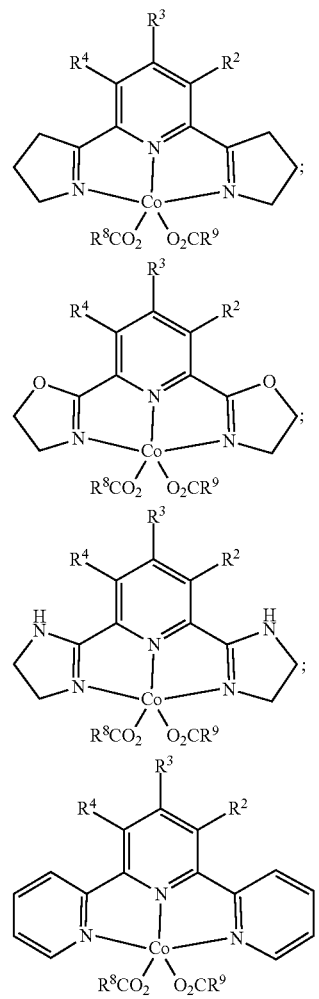

or a combination of two or more thereof.

9. The process of claim 1, wherein the catalyst is chosen from:

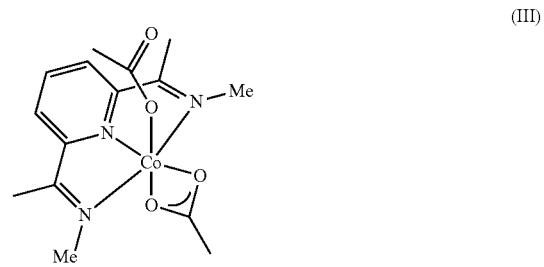
(III)

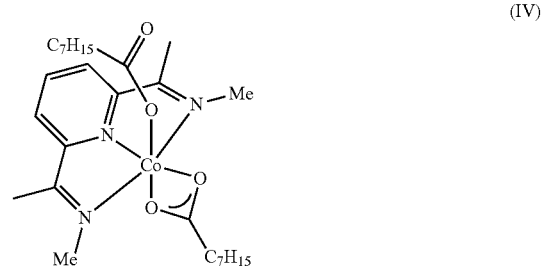
(IV)

-continued

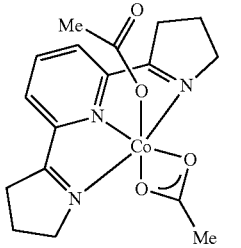
(V)

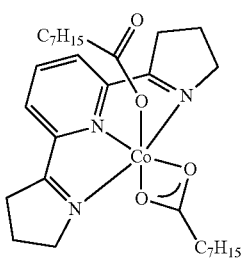
(VI)

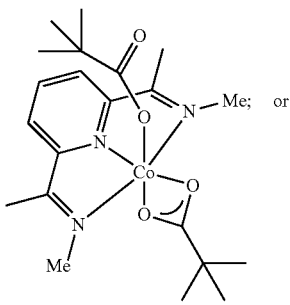
(VII)

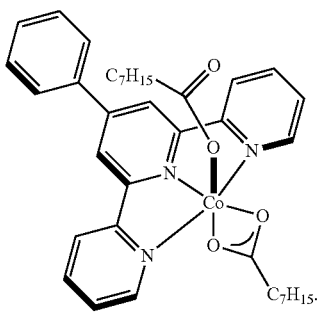
(VIII)

10. The process of claim 1, wherein the Co(carboxylate)$_2$ is chosen from Co(acetate)$_2$·4H$_2$O, anhydrous Co(acetate)$_2$, Co(2-ethylhexanoate)$_2$, or a combination of two or more thereof.

11. The process of claim 1, wherein component (a) is chosen from an olefin, a cycloalkene, an unsaturated polyether, a vinyl-functional alkyl-capped allyl or methallyl polyether, an alkyl-capped terminally unsaturated amine, an alkyne, a terminally unsaturated acrylate or methacrylate, an unsaturated aryl ether, a vinyl-functionalized polymer or oligomer, a vinyl-functionalized silane, a vinyl-functionalized silicone, an unsaturated fatty acid, an unsaturated ester, or a combination of two or more thereof.

12. The process of claim 1, wherein component (a) is chosen from a compound of the formula:

$R^{10}(OCH_2CH_2)_z(OCH_2CHR^{11})_w$—OR$^{12}$;

$R^{12}O(CHR^{11}CH_2O)_w(CH_2CH_2O)_z$—CR$^{13}_2$—C≡C—CR$^{13}_2$—(OCH$_2$CH$_2$)$_z$(OCH$_2$CHR$^{11}$)$_w$R$^{12}$;

$H_2C$=CR$^{11}$CH$_2$O(CH$_2$CH$_2$O)$_z$(CH$_2$CHR$^{11}$O)$_w$ CH$_2$CR$^{13}$=CH$_2$;

or a combination of two or more thereof, wherein R$^{10}$ is chosen from an unsaturated organic group containing from 2 to 10 carbon atoms; R$^{12}$ is chosen from hydrogen, a vinyl group, or a polyether capping group of from 1 to 8 carbon atoms; each occurrence of R$^{11}$ is independently chosen from a monovalent hydrocarbon group having 1-20 carbon atoms, an aryl group, an alkaryl, an aralkyl, a cycloalkyl group; each occurrence of R$^{13}$ is independently chosen from hydrogen, a monovalent hydrocarbon group having 1-20 carbon atoms, an aryl group, an alkaryl group, an aralkyl group, or a cycloalkyl group; each occurrence of z is 0 to 100 inclusive; and, each occurrence of w is 0 to 100 inclusive.

13. The process of claim 1, wherein component (a) is chosen from N,N-dimethylallyl amine, allyloxy-substituted polyethers, allyl glycidyl ether, 1,2-epoxy-4-vinylcyclohexane, propylene, 1-butene, 1-hexene, styrene, vinylnorbornane, 5-vinyl-norbornene, 1-octadecene, cyclopentene, cyclohexene, norbornene, 3-hexene, isobutylene, 3-methyl-1-octene, polybutadiene, polyisoprene, EPDM, oleic acid, linoleic acid, methyl oleate, a vinyl siloxane of the Formula IX,

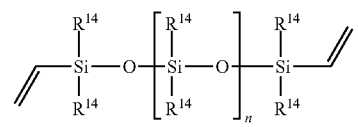
(IX)

or a combination of two or more thereof, wherein each occurrence of R$^{14}$ is independently a C1-C18 alkyl, C1-C18 substituted alkyl, vinyl, aryl, or a substituted aryl, and n is greater than or equal to zero.

14. The process of claim 1, wherein component (b) is chosen from a compound of the formula R$_a$SiH$_{4-a}$, (RO)$_a$SiH$_{4-a}$, HSiR$_a$(OR)$_{3-a}$, R$_3$Si(CH$_2$)$_f$(SiR$_2$O)$_k$SiR$_2$H, (RO)$_3$Si(CH$_2$)$_f$(SiR$_2$O)$_k$SiR$_2$H, Q$_u$T$_v$T$_p^H$D$_w$D$^H_y$M$^H_y$M$_z$, R$_3$Si(CH$_2$)$_h$SiOSiR$_2$(OSiR$_2$)$_j$OSiR$_2$H, or combinations of two or more thereof where each occurrence of R is independently a C1-C18 alkyl, a C1-C18 substituted alkyl, wherein R optionally contains at least one heteroatom, each occurrence of a independently has a value from 0 to 3, f has a value of 1 to 8, k has a value of 0 to 3000, each of p, u, v, y and z independently has a value from 0 to 20, w and x are from 0 to 3000, provided that p+x+y equals 1 to 1000 and the valences of the all the elements in the silyl hydride are satisfied, M represents a monofunctional group of formula R'$_3$SiO$_{1/2}$, D represents a difunctional group of formula R'$_2$SiO$_{2/2}$, T represents a trifunctional group of formula R'SiO$_{3/2}$, Q represents a tetrafunctional group of formula SiO$_{4/2}$, and M$^H$ represents HR'$_2$SiO$_{1/2}$ T$^H$ represents HSiO$_{3/2}$, and D$^H$ represents R'HSiO$_{2/2}$; each occurrence of R' is independently C1-C18 alkyl, C1-C18 substituted alkyl, wherein R' optionally contains at least one heteroatom; h is 1-8, and j is 0-10.

15. The process of claim 1, wherein the catalyst is present in an amount of from 0.001 mole percent to 10 mole percent based on the molar quantity of the unsaturated compound to be reacted.

16. The process of claim 1, wherein the process is conducted at a temperature of between about 0° C. and about 300° C.

17. The process of claim 1, wherein the process is conducted at a temperature of between about 60° C. and about 100° C.

18. The process of claim 9, wherein the process is conducted at a temperature of between about 60° C. and about 100° C., and the catalyst comprises a catalyst of Formula (III).

19. The process of claim 1, wherein the molar ratio of component (a) to component (b) is from about 5:1 to 1:4.

20. The process of claim 1, wherein the molar ratio of component (a) to component (b) is from about 2:1 to about 1:1.

21. The process of claim 1, wherein the catalyst is immobilized on a support chosen from carbon, silica, alumina, $MgCl_2$, zirconia, polyethylene, polypropylene, polystyrene, poly(aminostyrene), sulfonated polystyrene, or a combination of two or more thereof.

22. The process of claim 1, wherein the unsaturated compound (a) is added to a mixture of the silyl hydride (b) and the catalyst (c).

23. The process of claim 1, wherein the silyl hydride (b) is added to a mixture of the unsaturated compound (a) and the catalyst (c).

24. A process for producing a crosslinked material, comprising reacting a mixture comprising (a) a silyl-hydride containing polymer, (b) a vinyl-substituted siloxane, a vinyl substituted polysiloxane, an unsaturated polyolefin, or combinations thereof and (c) a catalyst, optionally in the presence of a solvent, in order to produce the crosslinked material, of the Formula (I) or an adduct thereof; Formula (II), or a combination of two or more thereof:

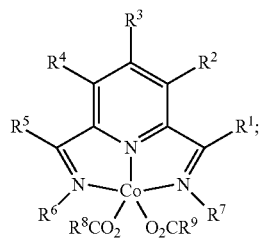

(I)

Co(carboxylate)$_2$   (II)

wherein each occurrence of $R^1$, $R^2$, $R^3$, $R^4$, and $R^5$ is independently chosen from hydrogen, a C1-C18 alkyl, a C1-C18 substituted alkyl, an aryl, a substituted aryl, or an inert substituent, where $R^1$-$R^5$, other than hydrogen, may optionally contain at least one heteroatom;

each occurrence of $R^6$ and $R^7$ is independently chosen from a C1-C18 alkyl, a C1-C18 substituted alkyl, an aryl, or a substituted aryl, where $R^6$ and $R^7$ may optionally contain at least one heteroatom;

optionally any two neighboring groups of $R^1$, $R^2$, $R^3$, $R^4$, $R^5$, $R^6$, and $R^7$ taken together may form a ring being a substituted or unsubstituted, saturated, or unsaturated cyclic structure, the ring optionally containing one or more heteroatoms;

$R^8$ and $R^9$ is each independently, chosen from an alkyl or aryl group optionally containing at least one heteroatom; and the carboxylate is derived from substituted or unsubstituted, straight-chain, branched or cyclic aliphatic carboxylic acid or aromatic carboxylic acid, and which optionally contains one or more heteroatoms chosen from O, N, S, P, Si, F, Cl, Br, I, or a combination of two or more thereof;

wherein the mixture is free of a reducing agent and a promoter.

25. The process of claim 24, wherein $R^8$ and $R^9$ are each chosen from a C1-C18 alkyl.

26. The process of claim 24, wherein $R^8$ and $R^9$ are each $CH_3$, 3-heptyl, or $C(CH3)_3$.

27. The process of claim 24, wherein $R^6$ and $R^7$ are independently chosen from a C1-C10 alkyl.

28. The process of claim 24, wherein $R^6$ and $R^7$ are each methyl, ethyl, or cyclohexyl.

29. The process of claim 24, wherein $R^1$-$R^7$ and $R^5$-$R^6$ taken together form a 5-membered heterocyclic ring structure or a 6-membered heterocyclic ring structure with the imine nitrogen.

30. The process of claim 29, wherein the ring structure further comprises one or more heteroatoms other than the imine nitrogen.

31. The process of claim 29, wherein the catalyst comprises a compound chosen from:

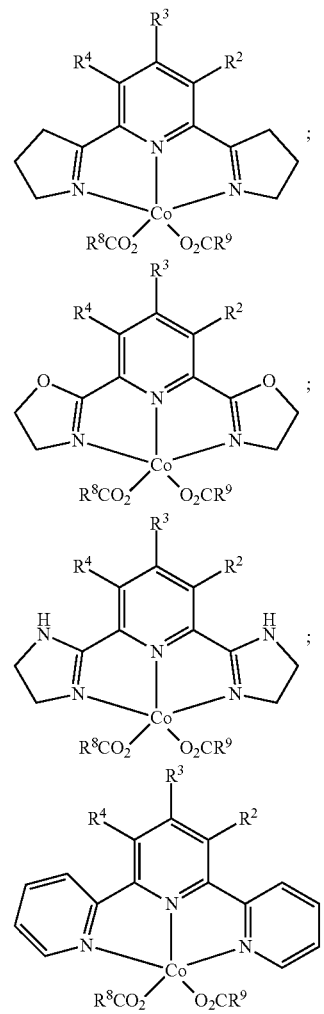

or a combination of two or more thereof.

32. The process of claim 24, wherein the catalyst is chosen from:

(III)

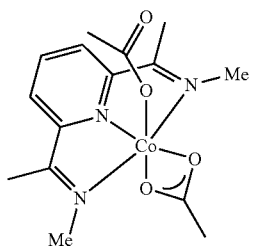

(IV)

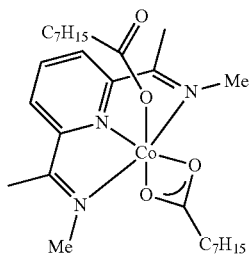

(V)

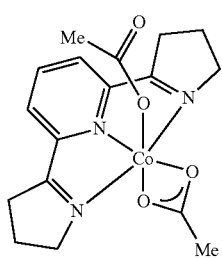

(VI)

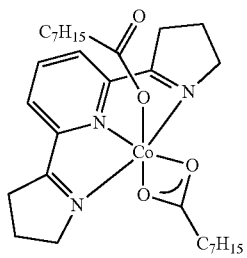

(VII)

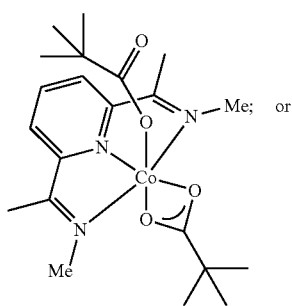

or (VIII)

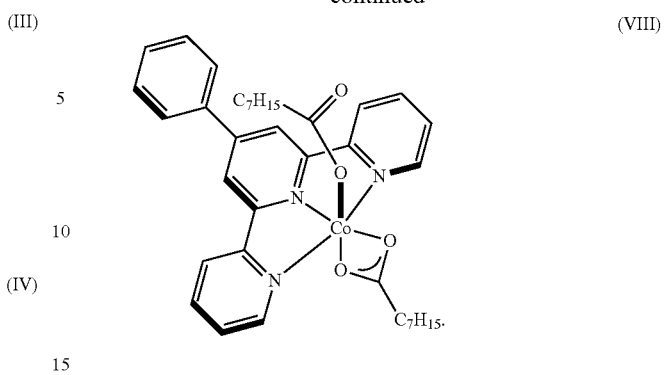

33. The process of claim 24, wherein the Co(carboxylate)$_2$ is chosen from Co(acetate)$_2$.4H$_2$O, anhydrous Co(acetate)$_2$, Co(2-ethylhexanoate)$_2$, or a combination of two or more thereof.

34. The process of claim 24, wherein component (b) is chosen from an olefin, a cycloalkene, an unsaturated polyether, a vinyl-functional alkyl-capped allyl or methallyl polyether, an alkyl-capped terminally unsaturated amine, an alkyne, a terminally unsaturated acrylate or methacrylate, an unsaturated aryl ether, a vinyl-functionalized polymer or oligomer, a vinyl-functionalized silane, a vinyl-functionalized silicone, an unsaturated fatty acid, an unsaturated ester, or a combination of two or more thereof.

35. The process of claim 24, wherein the catalyst is present in an amount of from 0.001 mole percent to 10 mole percent based on the molar quantity of the unsaturated compound to be reacted.

36. The process of claim 24, wherein the process is conducted at a temperature of between about 0° C. and about 300° C.

37. The process of claim 24, wherein the process is conducted at a temperature of between about 60° C. and about 100° C.

38. The process of claim 24, wherein the molar ratio of component (a) to component (b) is from about 5:1 to 1:4.

39. The process of claim 24, wherein the molar ratio of component (a) to component (b) is from about 2:1 to about 1:1.

40. The process of claim 24, wherein the unsaturated compound (b) is added to a mixture of the silyl hydride (a) and the catalyst (c).

41. The process of claim 24, wherein the silyl hydride (a) is added to a mixture of the unsaturated compound (b) and the catalyst (c).

\* \* \* \* \*